(12) United States Patent
Gu et al.

(10) Patent No.: US 11,438,491 B2
(45) Date of Patent: Sep. 6, 2022

(54) SYSTEMS AND METHODS FOR BLOCKING A TARGET IN VIDEO MONITORING

(71) Applicant: ZHEJIANG DAHUA TECHNOLOGY CO., LTD., Zhejiang (CN)

(72) Inventors: Zhengyi Gu, Hangzhou (CN); Xiaobo Zhang, Hangzhou (CN); Yiwei Li, Hangzhou (CN); Chongyuan Ye, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 252 days.

(21) Appl. No.: 16/746,955

(22) Filed: Jan. 19, 2020

(65) Prior Publication Data
US 2020/0154014 A1    May 14, 2020

Related U.S. Application Data

(63) Continuation of application No. PCT/CN2018/093678, filed on Jun. 29, 2018.

(30) Foreign Application Priority Data

Jul. 21, 2017  (CN) .......................... 201710598967.8
Feb. 8, 2018   (CN) .......................... 201810127524.5

(51) Int. Cl.
*H04N 5/225*    (2006.01)
*H04N 5/232*    (2006.01)
*H04N 5/262*    (2006.01)

(52) U.S. Cl.
CPC ....... *H04N 5/2254* (2013.01); *H04N 5/23238* (2013.01); *H04N 5/262* (2013.01)

(58) Field of Classification Search
None
See application file for complete search history.

(56) References Cited

U.S. PATENT DOCUMENTS 7,015,954 B1     3/2006  Foote et al.
2002/0122113 A1  9/2002  Foote
(Continued)

FOREIGN PATENT DOCUMENTS

CN   102226865 A   10/2011
CN   102645817 A    8/2012
(Continued)

OTHER PUBLICATIONS

The Extended European Search Report in European Application No. 18834378.4 dated Jul. 17, 2020, 11 pages.
(Continued)

*Primary Examiner* — Samira Monshi
(74) *Attorney, Agent, or Firm* — Metis IP LLC

(57) ABSTRACT

The present disclosure relates to systems and methods for generating an occlusion region in an image. The system includes a plurality of imaging devices, a storage device and at least one processor in communication with the storage device, wherein each of the plurality of imaging devices is configured to capture a component image presenting a scene. When executing the instructions, the at least one processor is configured to cause the system to determine a first occlusion region in an image formed based on at least one component image. The at least one processor is configured to determine how to generate a second occlusion region in at least one of the plurality of component images based on the area of the first occlusion region and an area threshold.

18 Claims, 27 Drawing Sheets

(56) References Cited

U.S. PATENT DOCUMENTS

| | | |
|---|---|---|
| 2008/0144973 A1 | 6/2008 | Jin |
| 2009/0169197 A1 | 7/2009 | Fujii et al. |
| 2012/0096126 A1 | 4/2012 | Kamei et al. |
| 2012/0098854 A1 | 4/2012 | Ohnishi |
| 2016/0105598 A1* | 4/2016 | Zeira .................. H04N 5/2252 348/143 |

FOREIGN PATENT DOCUMENTS

| | | |
|---|---|---|
| CN | 102226865 B | 8/2013 |
| CN | 103795978 A | 5/2014 |
| CN | 104345520 A | 2/2015 |
| CN | 105469379 A | 4/2016 |
| CN | 105791751 A | 7/2016 |
| CN | 105898208 A | 8/2016 |
| CN | 106375737 A | 2/2017 |
| CN | 106598078 A | 4/2017 |
| CN | 107290838 A | 10/2017 |
| CN | 107517360 A | 12/2017 |
| CN | 108156397 A | 6/2018 |
| EP | 2426637 A1 | 3/2012 |
| JP | 2000162665 A | 6/2000 |
| KR | 20080040919 A | 5/2008 |

OTHER PUBLICATIONS

International Search Report in PCT/CN2018/093678 dated Sep. 29, 2018, 5 pages.
Written Opinion in PCT/CN2018/093678 dated Sep. 29, 2018, 6 pages.
First Office Action in Chinese Application No. 201710598967.8 dated Feb. 3, 2019, 16 pages.
First Office Action in Chinese Application No. 201810127524.5 dated Aug. 1, 2019, 26 pages.

* cited by examiner

500

502 Determining a parameter indicating second occlusion position information and a parameter indicating second size information based on a parameter indicating first occlusion position information of a first occlusion region in a panoramic image, a parameter indicating first size information, and at least one combination coefficient

504 Determining at least one position of the second occlusion region in the at least one of the plurality of component images based on the second occlusion position information and the second size information

506 Generating the second occlusion region in the at least one of the plurality of component images

SYSTEMS AND METHODS FOR BLOCKING A TARGET IN VIDEO MONITORING

CROSS-REFERENCE TO RELATED APPLICATIONS

This application is a Continuation of International Application No. PCT/CN2018/093678 filed on Jun. 29, 2018, which claims priority of Chinese Patent Application No. 201810127524.5, filed on Feb. 8, 2018, and Chinese Patent Application No. 201710598967.8, filed on Jul. 21, 2017. The contents of above applications are incorporated herein by reference in entirety.

TECHNICAL FIELD

This disclosure generally relates to video monitoring, and more particularly, to systems and methods for blocking a target in video monitoring.

BACKGROUND

In contemporary society, video monitoring is widely used in various environments to ensure the security and stability of the society. With the development of the society, the public pays more and more attention to the personal privacy security, which makes it necessary to take some measures to protect private information of individuals during video capturing or video image processing.

SUMMARY

According to an aspect of the present disclosure, a system is provided. The system may include a sheltering device configured to operate between a sheltering status to block a view of a camera lens and an open status to unblock the view of the camera lens, a holder supporting the sheltering device and having an aperture which let through the camera lens, and an actuating device mounted on the holder and connected to the sheltering device. The actuating device may be configured to cause the sheltering device to operate between the sheltering status and the open status.

In some embodiments, the sheltering device may include at least one sheltering sheet pivotable between a first position associated with the open status of the sheltering device, and a second position associated with the sheltering status of the sheltering device.

In some embodiments, the at least one sheltering sheet may include an outer sheet and an inner sheet. In the first position, the outer sheet and the inner sheet may be folded. In the second position, the outer sheet and the inner sheet may be unfolded.

In some embodiments, the outer sheet may be a master sheet and the inner sheet may be a slave sheet during pivoting between the first position and the second position.

In some embodiments, the outer sheet may include a first driving surface and a second driving surface. The inner sheet may include a stopper movable between the first driving surface and the second driving surface. The first driving surface may drive the stopper to move when the at least one sheltering sheet moves from the first position to the second position. The second driving surface may drive the stopper to move when the at least one sheltering sheet moves from the second position to the first position.

In some embodiments, the outer sheet may include a notch structure. The first driving surface and the second driving surface may form two sides of the notch structure.

In some embodiments, the holder may include a third driving surface. In the second position, the first driving surface and the third driving surface may restrict a position of the stopper of the inner sheet.

In some embodiments, the holder may include a fourth driving surface. In the first position the second driving surface and the fourth driving surface may restrict a position of the stopper of the inner sheet.

In some embodiments, the actuating device may include a gear mounted on the outer sheet to move the outer sheet through a rotation, and a shaft connected to the gear to rotate the gear.

In some embodiments, the actuating device may include a status detection unit configured to determine that the at least one sheltering sheet is not in any position of the first position and the second position. The status detection unit may actuate the actuating device to move the at least one sheltering sheet until the at least one sheltering sheet reaches one of the first position and the second position.

In some embodiments, the actuating device may include a motor configured to actuate the actuating device when the motor is on.

In some embodiments, the system may further include a plurality of imaging devices, each of the plurality of imaging devices configured to capture a component image presenting a scene, a storage device storing a set of instructions, and at least one processor in communication with the storage device. When the at least one processor executes the instructions, the at least one processor may be configured to cause the system to perform one or more of the following operations. The at least one processor may obtain a panoramic image, the panoramic image being formed by combining the plurality of component images according to at least one combination coefficient. The at least one processor may identify a first occlusion region in the panoramic image. The at least one processor may determine one or more first parameters associated with the first occlusion region. The at least one processor may determine, based on the at least one combination coefficient and the one or more first parameters, one or more second parameters associated with a second occlusion region in at least one of the plurality of component images. The at least one processor may generate, based on the one or more second parameters, the second occlusion region in the at least one of the plurality of component images.

In some embodiments, the one or more first parameters may include a parameter indicating a first occlusion position information of the first occlusion region in the panoramic image. The one or more second parameters may include a parameter indicating a second occlusion position information of the second occlusion region in the at least one of the plurality of component images. To determine the one or more second parameters associated with the second occlusion region in the at least one of the plurality of component images, the at least one processor may determine, based on the parameter indicating the first occlusion position information and the at least one combination coefficient, the parameter indicating the second occlusion position information.

In some embodiments, the at least one combination coefficient may include a coefficient relating to a change of width of a component image and a coefficient relating to a distortion of the component image. To determine the parameter indicating the second occlusion position information of the second occlusion region in the at least one of the plurality of component images, the at least one processor may determine whether the first occlusion region in the panoramic image covers a common line shared by a left component image and a right component image. In response to a determination that the first occlusion region covers the common line shared by the left component image and the right component image, the at least one processor may determine, based on the at least one combination coefficient, the parameter indicating the second occlusion position information of the second occlusion region in the left component image or the right component image.

In some embodiments, the at least one combination coefficient may include a coefficient relating to a change of height of a component image and a coefficient relating to a distortion of the component image. To determine the parameter indicating the second occlusion position information of the second occlusion region in the at least one of the plurality of component images, the at least one processor may determine whether the first occlusion region in the panoramic image covers a common line shared by an upper component image and a lower component image. In response to a determination that the first occlusion region covers the common line shared by the upper component image and the lower component image, the at least one processor may determine, based on the at least one combination coefficient, the parameter indicating the second occlusion position information of the second occlusion region in the upper component image or the lower component image.

In some embodiments, the one or more first parameters may include a parameter indicating a first size information of the first occlusion region in the panoramic image. The one or more second parameters may include a parameter indicating a second size information of the second occlusion region in the at least one of the plurality of component images. To determine the one or more second parameters associated with the second occlusion region in the at least one of the plurality of component images, the at least one processor may determine, based on the parameter indicating the first size information of the first occlusion region and the at least one combination coefficient, the parameter indicating the second size information of the second occlusion region in the at least one of the plurality of component images.

In some embodiments, the at least one combination coefficient may include a coefficient relating to a change of width of a component image and a coefficient relating to a distortion of the component image. To determine the parameter indicating the second size information of the second occlusion region in the at least one of the plurality of component images, the at least one processor may determine whether the first occlusion region in the panoramic image covers a common line shared by a left component image and a right component image. In response to a determination that the first occlusion region covers the common line shared by the left component image and the right component image the at least one processor may determine, based on the at least one combination coefficient, the parameter indicating the second size information of the second occlusion region in the left component image or the right component image.

In some embodiments, the at least one combination coefficient may include a coefficient relating to a change of height of a component image and a coefficient relating to a distortion of the component image. To determine the parameter indicating the second size information of the second occlusion region in the at least one of the plurality of component images, the at least one processor may determine whether the first occlusion region in the panoramic image covers a common line shared by an upper component image and a lower component image. In response to a determination that the first occlusion region covers the common line shared by the upper component image and the lower component image, the at least one processor may determine, based on the at least one combination coefficient, the parameter indicating the second size information of the second occlusion region in the upper component image or the lower component image.

According to another aspect of the present disclosure, a system is provided. The system may include a plurality of imaging devices, each of the plurality of imaging devices configured to capture a component image presenting a scene, a storage device storing a set of instructions, and at least one processor in communication with the storage device. When the at least one processor executes the instructions, the at least one processor may be directed to perform one or more of the following operations. The at least one processor may obtain a panoramic image, the panoramic image being formed by combining the plurality of component images according to at least one combination coefficient. The at least one processor may identify a first occlusion region in the panoramic image. The at least one processor may determine one or more first parameters associated with the first occlusion region. The at least one processor may determine, based on the at least one combination coefficient and the one or more first parameters, one or more second parameters associated with a second occlusion region in at least one of the plurality of component images. The at least one processor may generate, based on the one or more second parameters, the second occlusion region in the at least one of the plurality of component images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments; in which like reference numerals represent similar structures throughout the several views of the drawings, and wherein:

FIG. 5 is a flow chart illustrating an exemplary process for generating an occlusion region in an image according to some embodiments of the present disclosure;

DETAILED DESCRIPTION

Figure 1:
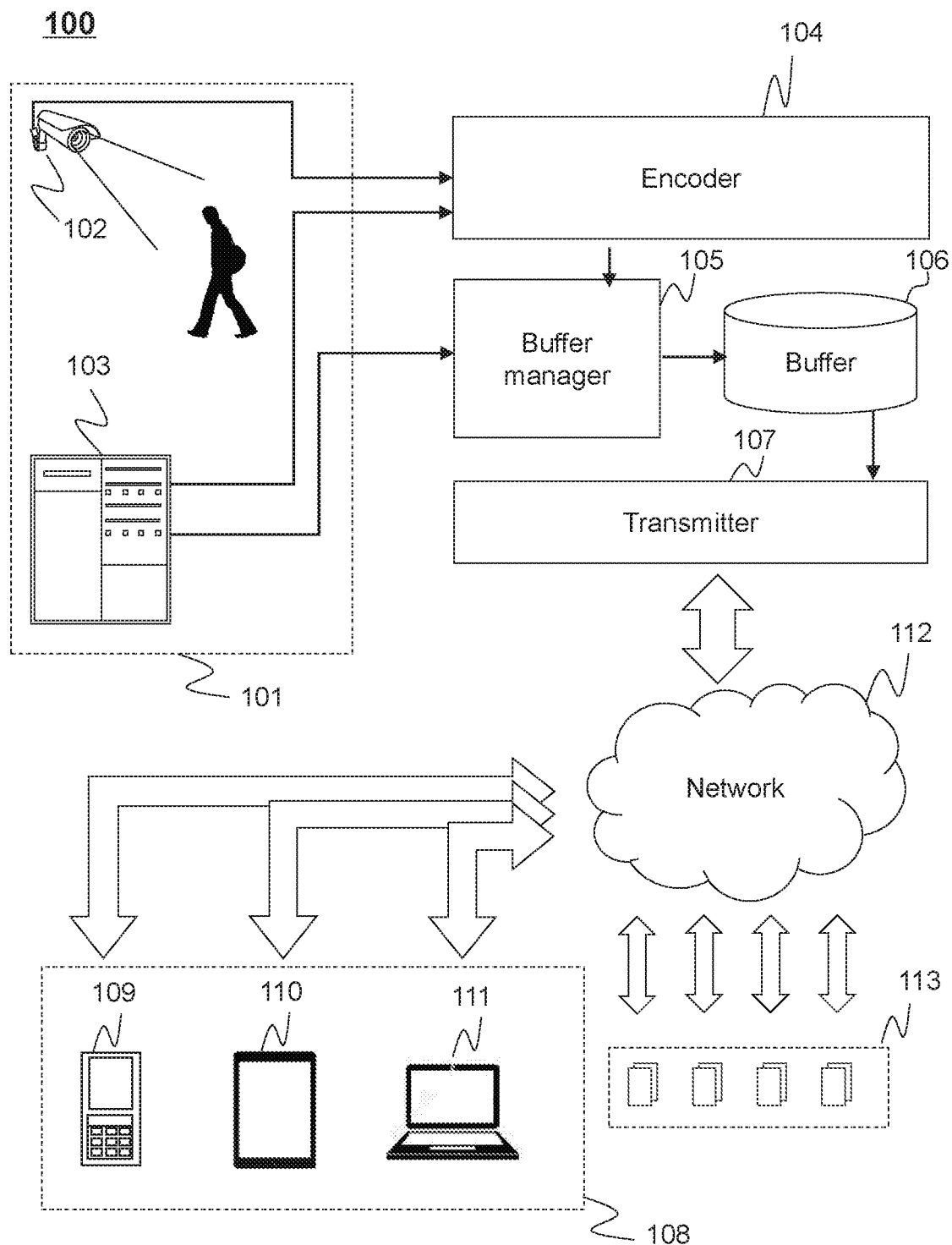
FIG. 1 is a schematic diagram illustrating an exemplary video processing system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for generating an occlusion region in an image. The system includes a plurality of imaging devices, a storage device and at least one processor in communication with the storage device, wherein each of the plurality of imaging devices is configured to capture a component image presenting a scene. The system may determine a first occlusion region in a panoramic image formed based on a plurality of component images. The system may process one or more parameters associated with the first occlusion region by, e.g., comparing the area of the first occlusion region with an area threshold. The system may further determine a second occlusion region in at least one of the plurality of component images based on the processed result.

FIG. 1 is a schematic diagram illustrating an exemplary video processing system according to some embodiments of the present disclosure. The video processing system 100 may be configured to process an image or a video composed of a plurality of images (also referred to as "video frames"). As shown, the video processing system 100 may include a video source 101, an encoder 104, a buffer manager 105, a buffer 106, a transmitter 107, a terminal 108 (or a plurality of terminals 108), a network 112, and a network storage device 113 (or a plurality of network storage devices 113).

The video source 101 may provide a video through the network 112 to a user of the terminal 108. The video source 101 may generate a video itself or via a video transfer site. For example, the video source 101 may include a camera 102 and/or a media server 103.

The camera 102 may be able to capture a video including one or more images. The image may be a three-dimensional (3D) image or a two-dimensional (2D) image. In some embodiments, the camera 102 may be a panoramic camera, a digital camera, a video camera, a security camera, a web camera, a smartphone, a tablet, a laptop, a video gaming console equipped with a web camera, a camera with multiple lenses, etc. An exemplary video camera may include a color camera, a digital video camera, a camcorder, a PC camera, a webcam, an infrared (IR) video camera, a low-light video camera, a thermal video camera, a CCTV camera, a pan, a tilt, a zoom (PTZ) camera, a video sensing device, an Internet Protocol (IP) camera, or the like, or a combination thereof.

The camera 102 may include a lens, a shutter, a sensor, a camera processing circuits, and a storage device. The lens may be an optical device that focuses a light beam to form an image. The lens may have an adjustable focal length. In some embodiments, the lens may include one or more lenses. The lens may be configured to take images of a scene. The scope of the scene may be controlled by the focal length of the lens.

The shutter may be opened to let light through the lens when an image is captured. The shutter may be controlled manually or automatically by the camera processing circuits.

In some embodiments, the camera 102 may be a panoramic camera. Exemplary panoramic camera may include stereo cyclograph, wonder panoramic camera, handmade panoramic camera, rotating panoramic camera, fixed lens camera. A panoramic camera may generate a panoramic image. As used herein, a panoramic image may refer to an image showing a field of view having an angle equal to or greater than a specific threshold. The threshold may be 90° C., 120° C., 140° C., 160° C., etc. In some embodiments, the panoramic image may show a field of view greater than the human eye. The panoramic image may be generated by combining a plurality of component images taken by the panoramic camera. In some embodiments, the plurality of component images may be with horizontally elongated fields of view.

In some embodiments, the camera 102 may include a sheltering device. As used herein, a sheltering device may refer to a device capable of operating between a sheltering status to block the view of the lens of the camera 102 and an open status to unblock the view of the lens of the camera 102. The camera 102 may not capture images when the sheltering device is in the sheltering status.

The sensor may be configured to receive light passing through the lens and transform the received light into electrical signals. The sensor may include charge coupled device (CCD) and complementary metal-oxide semiconductor (CMOS).

The camera processing circuits may be configured to process data and/or information relating to the camera 102 in the present disclosure and/or control one or more components (e.g., the lens, the shutter) in the camera 102. For example, the camera processing circuits may automatically determine target values of exposure parameters of the camera 102 such as an exposure time, an exposure gain, and an aperture size. The camera processing circuits may also adjust quality images taken by the camera 102, such as the sharpness of the images. For another example, the camera processing circuits may determine whether the view of the camera 102 needs to be blocked using the sheltering device.

In some embodiments, the camera processing circuits may be local to or remote from the camera 102. For example, the camera processing circuits may communicate with the camera 102 via a network. As another example, the camera processing circuits may be integrated into the camera 102.

The storage device may store data, instructions, and/or any other information. In some embodiments, the storage device may store data obtained from the camera processing circuits. For example, the storage device may store captured images. In some embodiments, the storage device may store data and/or instructions that the camera processing circuits may execute or use to perform exemplary methods described in the present disclosure. In some embodiments, the storage device may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The media sever 103 may be a server (e.g., a computer or a group of computers) for storing, broadcasting, selling, renting, or providing videos. The media server 103 may also include an image and/or video processing electronic device (not shown) configured to process the images and/or video streams from the video source 101 using the methods introduced in the present disclosure.

A "video" provided by the video source 101 may be an electronic medium (e.g., a data file, a bit stream, a series of signal) for the recording, copying, replaying, broadcasting, and display of moving visual media, such as a TV program, an animation, a movie, a surveillance or monitoring video, a video shared through a social platform, an advertisement, a live show, a video call, a video conference, or the like, or a combination thereof. A video may include a plurality of frames, which may also be referred to as video frames. A frame may be one of a plurality of still images that compose a completer video. By sequentially displaying frames (e.g., images) of a video in a rate (frame rate), a video player mounted on the terminal 108 may present the video to a user.

Before transmitting a video through the network 112, the video source 101 may send the video to the encoder 104 for encoding the video, or send the video to the buffer 106 through the buffer manager 105. For example, the video provided by the video source 101 may be relatively large in size (e.g., raw video data, video encoded with low compression rate), thus the video source 101 may send the video to the encoder 104 for video compression before the transmission. As another example, the video provided by the video source 101 may be proper in size, and the video source 101 may directly send the video to the buffer 106 through the buffer manager 105 for video transmission.

The encoder 104 may be a remote device from the video source 101 or a local device integrated in the video source 101. It may encode the video provided by the video source 101 before the video is transmitted through the network 112. Through encoding, the video to be transmitted may be compressed and/or encrypted. For example, the encoder 104 may encode a video using an algorithm for video compression so that the cost (e.g., time cost, resource cost, financial cost) for transmitting the video may be significantly reduced. Alternatively or additionally, the encoder 104 may encode a video using an algorithm for video encryption so that the video may be transmitted safely and a user without permission may not watch the video. The encoder 104 may encode the video frame by frame and generate a plurality of encoded video frames. The encoder 104 may send the encoded video frame to the buffer 106 through the buffer manager 105. Alternatively or additionally, the buffer manager 105 may obtain the encoded video frame from the encoder 104.

In some embodiments, the encoder 104 may encode the video to be transmitted using a Moving Picture Experts Group (MPEG) based encoding technique.

The video frames and/or images to be transmitted may be stored in the buffer 106 in the form of a video frame buffering queue, which may be managed by the buffer manager 105. The buffer 106 may use a queue based data structure for buffering the video to be transmitted.

The buffer 106 may be a storage device for buffering the video to be transmitted through the network 112. It may be a remote device from the video source 101 or a local device integrated in the video source 101, such as the storage medium of the camera 102. The buffer 106 may include a mass storage device, a removable storage device, a volatile read-and-write memory, a read-only memory (ROM), or the like, or any combination thereof.

The transmitter 107 may transmit the video or video frames buffered in the buffer 106 to the network 112. The transmitter 107 may transmit video or video frames in response to instructions sent from the video provider 101, the buffer manager 105, the terminal 108, or the like, or a combination thereof. Alternatively or additionally, the transmitter 107 may spontaneously transmit video or video frames stored in the buffer 106. The transmitter 107 may transmit video or video frames through the network 112 to the terminal 108 through one or more network connections (wired and/or wireless).

In some embodiments, the transmitter 107 may be capable of determining the transmission performance of the network 112. For example, the transmitter 107 may determine the transmission performance by monitoring its data transmission rate.

The terminal 108 may receive the transmitted video through the network 112. The terminal 108 may decode (e.g., through a video player mounted on the terminal 108) the transmitted video or video frames using a decoding algorithm and display the video to a user. The decoding algorithm may correspond to the encoding algorithm used by the encoder 104.

The terminal 108 may be various in forms. For example, the terminal 108 may include a mobile device 109, a tablet computer 110, a laptop computer 111, or the like, or any combination thereof. In some embodiments, the mobile device 109 may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 108 may be part of a processing engine.

The network 112 may include any suitable network that can facilitate the transmission of a video provided by the video source 101 to the terminal(s) 108. The network 112 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 112 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 112 may include one or more network access points. For example, the network 112 may include wired and/or wireless network access points such as base stations and/or internet exchange points through which a video provided by the video source 101 may be transmitted to the terminal 108.

In some embodiments, the network 112 may include one or more network storage devices 113. The network storage device 113 may be a device for buffering or caching data transmitted in the network 112. The video or video frame transmitted by the transmitter 107 may be buffered or cashed in one or more network storage devices 113 before being received by the terminal 108. The network storage device 113 may be a server, a hub, a gateway, or the like, or a combination thereof.

It may be noted that, one or more of the encoder 104, the buffer manager 105, the buffer 106 and the transmitter 107 may be a stand-alone device or a module integrated into the video source 101. For example, one or more of the encoder 104, the buffer manager 105, the buffer 106 and the transmitter 107 may be integrated into the camera 102 or the media server 103. As another example, the encoder 104, the buffer manager 105, the buffer 106 and the transmitter 107 may be included in a video processing engine which may communicate with the video source 101 through direct wired connection, the network 112, or another network not shown in FIG. 3. As a further example, the encoder 104 may be a stand-alone device (e.g., a computer or a server), and the buffer manager 105, the buffer 106 and the transmitter 107 may be included in another stand-alone device.

Figure 2:
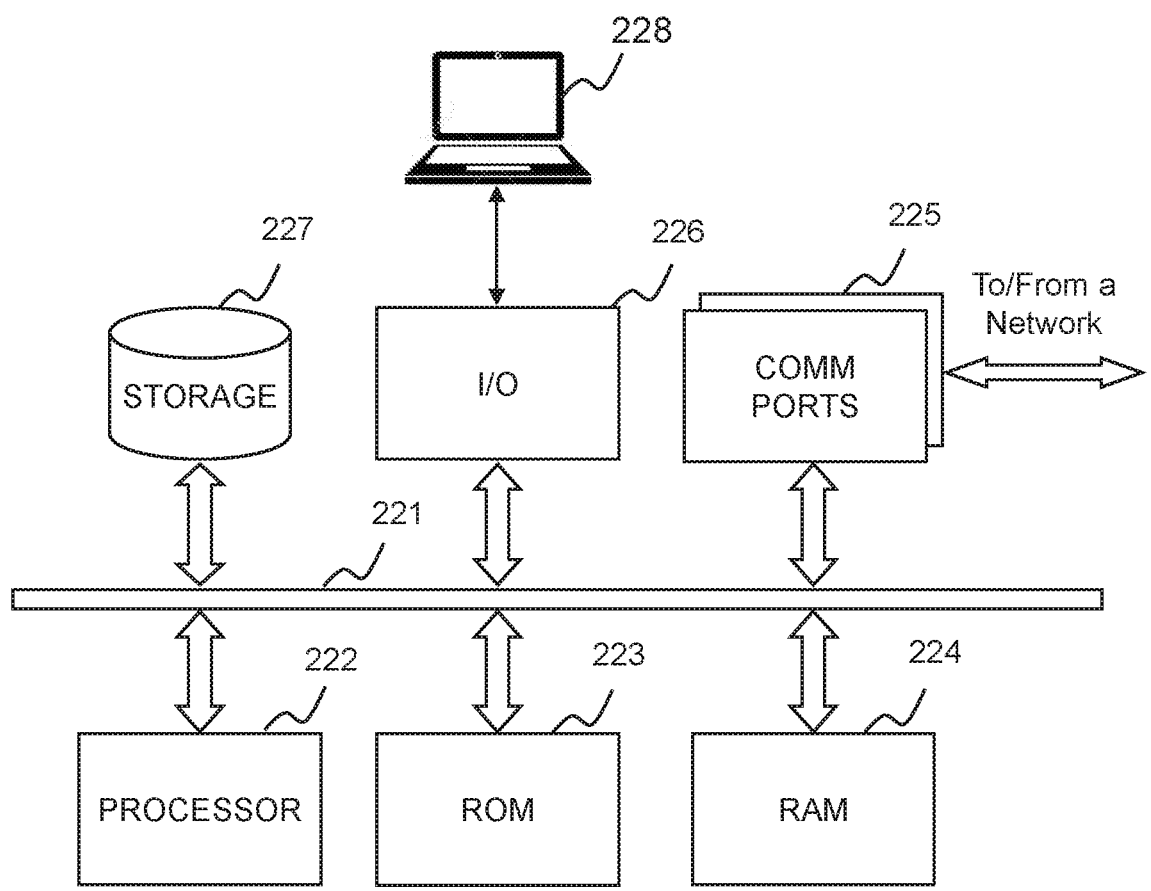
FIG. 2 is a schematic diagram illustrating exemplary components of an exemplary computing device according to some embodiments of the present disclosure.

FIG. 2 is a schematic diagram illustrating exemplary hardware and/or software components of an exemplary computing device according to some embodiments of the present disclosure. For example, the computing device 200 may be the server 103, the processor of the camera 102, and/or an electronic device specialized in video or image processing. The encoder 104 and buffer manager 105 may also be implemented on the computing device 200. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 227 may store data/information obtained from the video source 101, the encoder 104, the buffer manager 105, the buffer 106, the transmitter 107, the terminal 108, the network 112, the network storage device 113, and/or any other component of the video processing system 100. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform exemplary methods described in the present disclosure. For example, the storage 222 may store a program for the processing engine (e.g., the server 103) for determining a regularization item.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 112) to facilitate data communications. The communication port 225 may establish connections between the video source 101, the encoder 104, the buffer manager 105, the buffer 106, the transmitter 107, the terminal 108, the network 112, the network storage device 113, and/or any other component of the video processing system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 225 may be a specially designed communication port.

Figure 3:
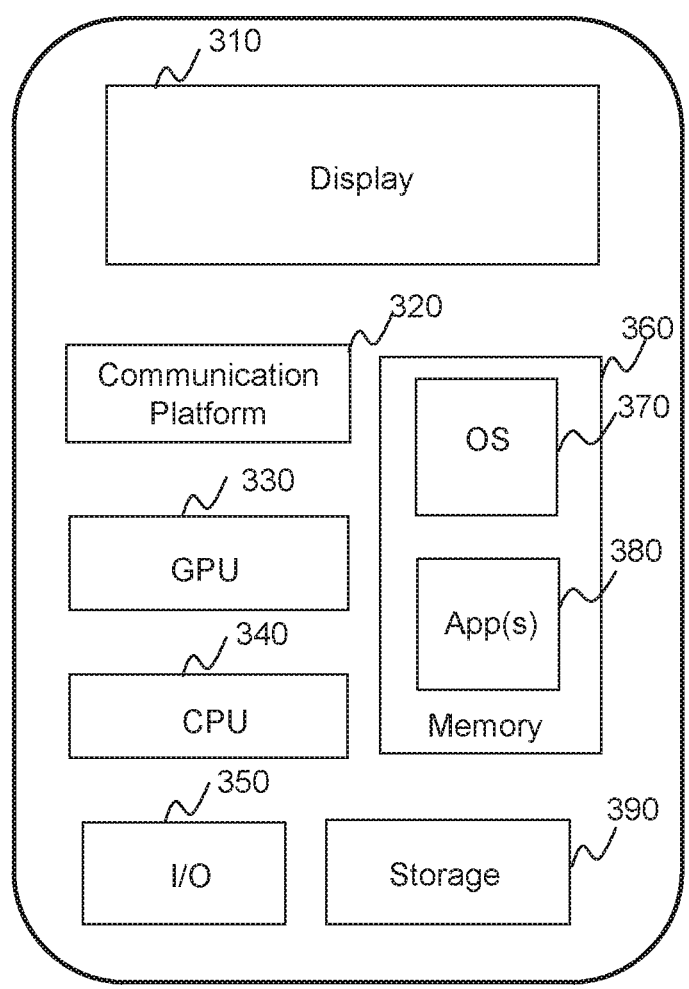
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the terminal 108. The applications 380 may include a video player for receiving a video provided by the video source 101 through the network 112 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
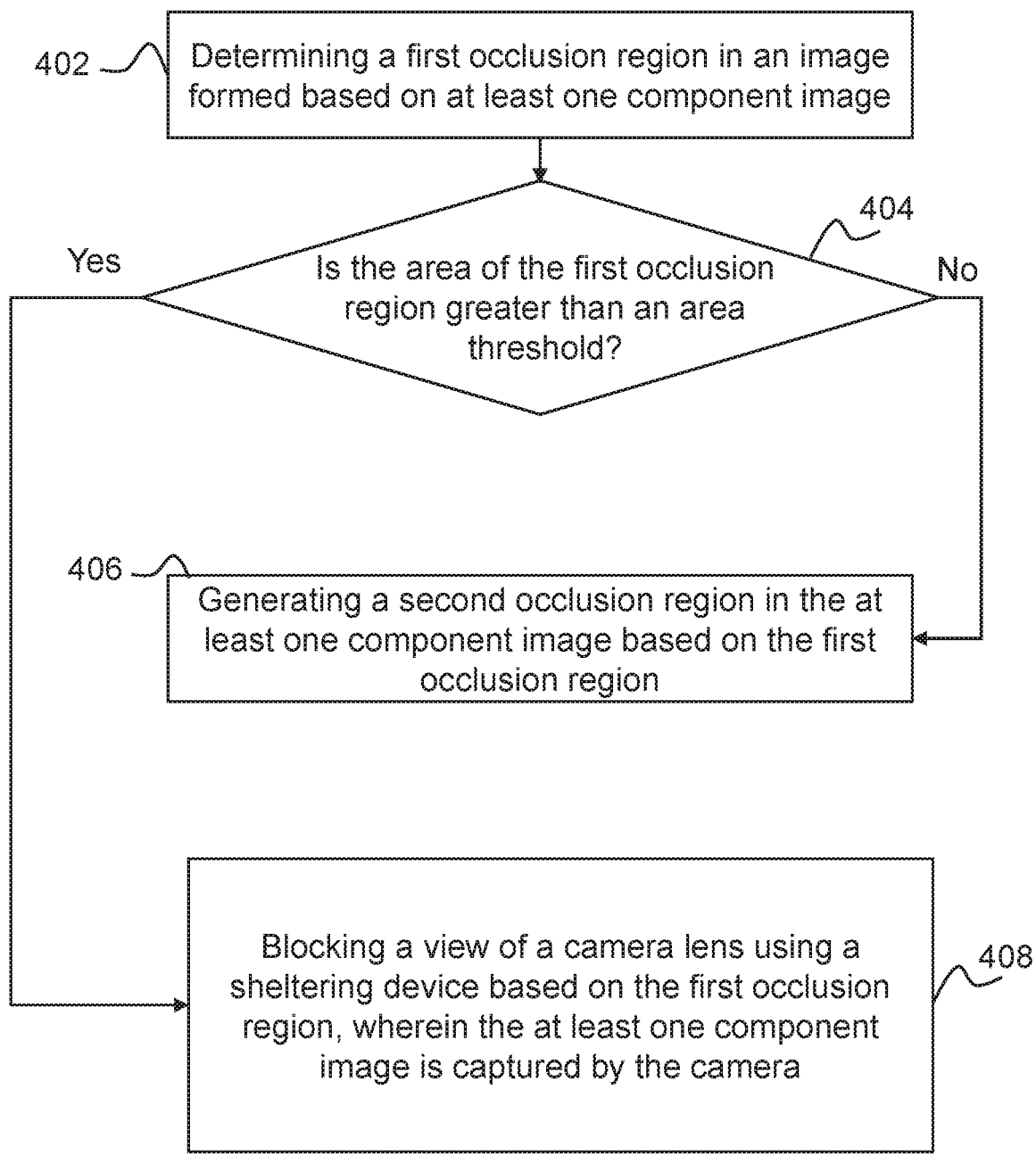
FIG. 4 is a flow chart illustrating an exemplary process for processing an image according to some embodiments of the present disclosure.

FIG. 4 is a flow chart illustrating an exemplary process for processing an image according to some embodiments of the present disclosure. In some embodiments, the process 400 may be implemented on the video processing system 100 as illustrated in FIG. 1. For example, the process 400 may be stored in a storage medium (e.g., the network storage device 113, or the storage 227 of the computing device 228) as the form of instructions, and invoked and/or executed by the media server 103. The operations in the process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below may not be intended to be limiting.

In 402, the media server 103 may determine a first occlusion region in an image formed based on at least one component image. As used herein, an occlusion region in an image may refer to a portion of the image whose original information is blurred or blocked. The blurred or blocked portion of the image may include privacy information (e.g., a face of a human, a license plate of a vehicle). In some embodiments, the media server 103 may determine the first occlusion region by identifying a target (e.g., human, vehicles) in the image based on one or more features. The media server 103 may identify the one or more features in the images using one or more feature descriptor. Exemplary feature descriptors may include a speeded up robust feature (SURF), a multi-support region order-based gradient histogram (MROGH), a binary robust independent element feature (BRIEF), or the like, or a combination thereof. In some embodiments, the media server 103 may determine the first occlusion region according to an instruction inputted by a user. For example, the user may manually define the first occlusion region in the image via an interface.

In some embodiments, the image formed based on at least one component image may be a panoramic image that shows a field of view having an angle equal to or greater than a specific threshold. The threshold may be 90° C., 120° C., 140° C., 160° C., etc. In some embodiments, the panoramic image may show a field of view greater than the human eye. In some embodiments, the panoramic image may include a plurality of component images that are determined based on multi-channel video signals. The plurality of component images may form the panoramic image according to at least one combination coefficient. In some embodiments, the panoramic image may be a single image determined based on a single channel video signal.

In 404, the media server 103 may determine whether the area of the first occlusion region is greater than an area threshold. In some embodiments, the area threshold may be a default setting of the video processing system 100, or may be adjustable under different situations. The area threshold may be adjustable based on the area of the image, the type of the image (e.g., panoramic image). For example, the area threshold may be positively correlated with the area of the image. For example, the larger the image is, the larger the area threshold may be; the smaller the image is, the smaller the area threshold may be.

In response to the determination that the area of the first occlusion region is less than or equal to the area threshold, the processing engine 112 may execute the process 400 to operation 406 to generate a second occlusion region in the at least one component image based on the first occlusion region.

In response to the determination that the area of the first occlusion region is greater than the area threshold, the processing engine 112 may execute the process 400 to operation 408 to block a view of a camera lens that captures the at least one component image. In some embodiments, the view of the camera lens may be blocked by a sheltering device.

In 406, in response to the determination that the area of the first occlusion region is less than or equal to the area threshold, the media server 103 may generate a second occlusion region in the at least one component image based on the first occlusion region. The media server 103 may determine the second occlusion region in the at least one component image based on a parameter indicating the position information of the first occlusion region in the image, a parameter indicating the size information of the first occlusion region in the image, and at least one combination coefficient. For example, the media server 103 may determine a parameter indicating the position information of the second occlusion region in the at least one component image and a parameter indicating the size information of the second occlusion region in the at least one component image based on the parameters indicating the position information and the size information of the first occlusion region. Detailed descriptions regarding the generation of the second occlusion region may be found elsewhere in the present disclosure (e.g., FIG. 5, and the descriptions thereof).

In 408, in response to the determination that the area of the first occlusion region is greater than the area threshold, the media server 103 may block a view of a camera lens using a sheltering device based on the first occlusion region, wherein the at least one component image is captured by the camera. The media server 103 may block the view of the camera lens by changing the sheltering device from an open status to a sheltering status. In the open status, a plurality of sheltering sheets are folded and packed up in an accommodation space to unblock the view of the camera lens. In the sheltering status, the plurality of sheltering sheets are unfolded to form a sheltering plate to block the view of the camera lens. In some embodiments, the media server 103 may block the view of the camera lens using a sheltering device during a specific time period that is determined based on a target identification or an instruction inputted by a user. For example, the media server 103 may block the view of the camera lens using the sheltering device when a human appears in the view of the camera lens. In some embodiments, the media server 103 may block the view of the camera lens using the sheltering device when the camera lens faces towards a certain direction. For example, the media server 103 may block the view of the camera lens using the sheltering device when the camera lens moves to a position where a private scene can be captured by the camera. Detailed descriptions regarding the sheltering device may be found elsewhere in the present disclosure (e.g., FIGS. 18 through 25, and the descriptions thereof).

FIG. 5 is a flow chart illustrating an exemplary process for generating an occlusion region in an image according to some embodiments of the present disclosure. In some embodiments, the process 500 may be implemented on the video processing system 100 as illustrated in FIG. 1. For example, the process 500 may be stored in a storage medium (e.g., the network storage device 113, or the storage 227 of the computing device 228) as the form of instructions, and invoked and/or executed by the media server 103. The operations in the process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below may not be intended to be limiting.

In 502, the media server 103 may determine a parameter indicating the second occlusion position information of a second occlusion region in at least one of a plurality of component images and a parameter indicating the second size information of the second occlusion region in the at least one of the plurality of component images based on a parameter indicating the first occlusion position information of a first occlusion region in a panoramic image, a parameter indicating the first size information of the first occlusion region in the panoramic image, and at least one combination coefficient. The panoramic image may be captured and formed based on multi-channel video signals.

In 504, the media server 103 may determine at least one position of the second occlusion region in the at least one of the plurality of component images based on the second occlusion position information and the second size information.

In 506, the media server 103 may generate the second occlusion region in the at least one of the plurality of component images.

In some embodiment, to generate the second occlusion region in the at least one of the plurality of component images of the panoramic image, the media server 103 may determine the position and size of the second occlusion region in the at least one of the plurality of component images based on the position and the size of the first occlusion region in the panoramic image and the at least one combination coefficient of the panoramic image, and perform an occlusion operation. Compared to processing the panoramic image as a complete image and ignoring the processing of cropping and stitching during synthesizing the panoramic image in the prior art, in the embodiment of the present disclosure, the media server 103 may not only determine the second occlusion position information based on the position and size of the first occlusion region, but also determine the second occlusion region accurately in the at least one of the plurality of component images without cropping based on the at least one combination coefficient associated with the panoramic image, so that the second occlusion region may be accurately determined and the occlusion effect of the second occlusion region may be improved.

The panoramic image may be generally obtained by capturing component images using a plurality of single-channel cameras of a multi-vision panoramic stitching camera system, and combining the plurality of component images captured by a central processing unit. The media server 103 may add an occlusion region to block the privacy on the panoramic image. The media server 103 may perform a backward calculation based on a panoramic combination algorithm to obtain the image effect of each component image before the combination process. Different cameras may have different combining parameters due to individual deviations, and the media server 113 may correct the plurality of component images during the combination.

The first occlusion position information may refer to an original starting point coordinate of the first occlusion region. The media server 113 may determine the original starting point coordinate of the first occlusion region as the coordinate of a point in the lower left corner of the occlusion region in the panoramic image. When converting the first occlusion region to the second occlusion region in the at least one of the plurality of component images, the media server 113 may set the starting point as needed. All the techniques for determining the second occlusion position information based on the first occlusion position information, the first size information and the at least one combination coefficient of the panoramic image are within the protection scope of the present disclosure.

The first size information may refer to the width and the height of the first occlusion region in the panoramic image.

Figure 6:
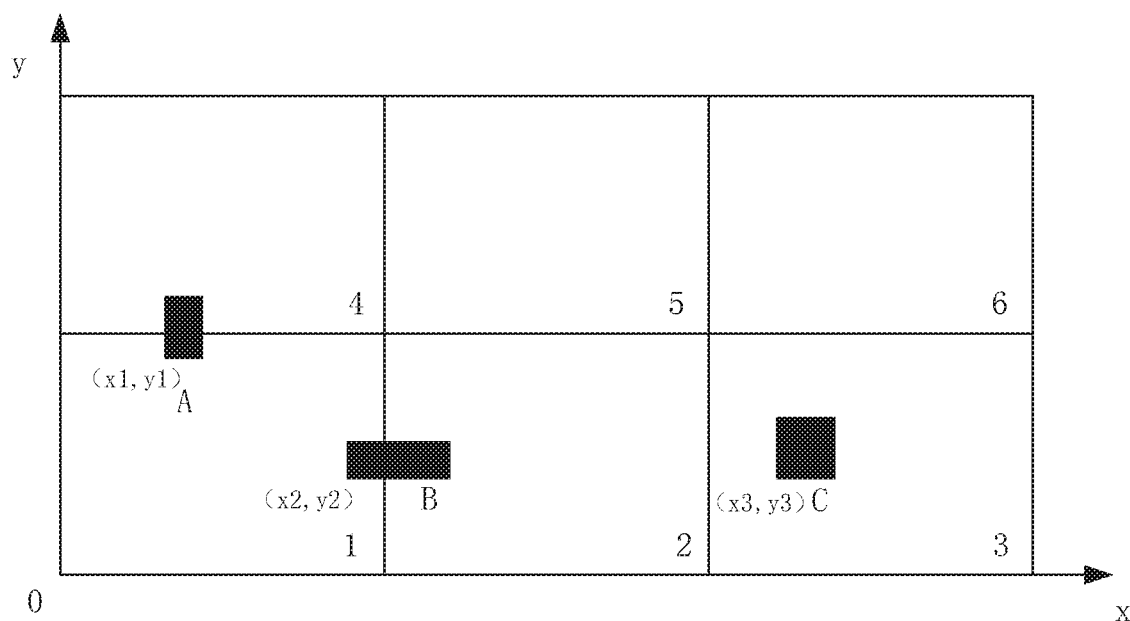
FIG. 6 is a schematic diagram illustrating an exemplary process for determining first occlusion position information according to some embodiments of the present disclosure.

FIG. 6 is a schematic diagram illustrating an exemplary process for determining the first occlusion position information according to some embodiments of the present disclosure. As illustrated in FIG. 6, there are 3 first occlusion regions in the panoramic image, including a first occlusion region A, a first occlusion region B and a first occlusion region C. First, it is necessary to determine the first occlusion position information, e.g., the original starting point coordinate of each of the three first occlusion regions.

Generally, the media server 103 may determine the position information of a point in the lower left corner of a first occlusion region in the panoramic image as the first occlusion position information. As illustrated in FIG. 6, the original starting point of the occlusion region A in the panoramic image is the lower left point (x1, y1), the original starting point of the occlusion region B in the panoramic image is the lower left point (x2, y2), and the original starting point of the occlusion region C in the panoramic image is the left lower point (x3, y3).

Figure 7:
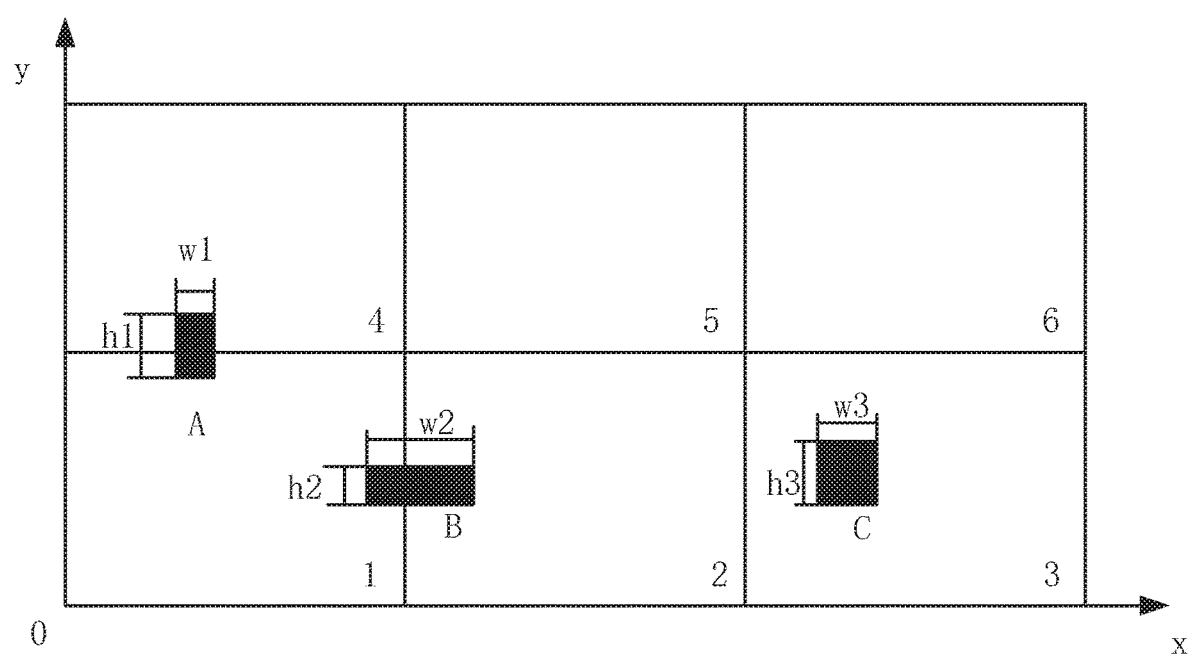
FIG. 7 is a schematic diagram illustrating an exemplary process for determining first size position information according to some embodiments of the present disclosure.

FIG. 7 is a schematic diagram illustrating an exemplary process for determining the first size position information according to some embodiments of the present disclosure. As illustrated in FIG. 7, the media server 103 may determine the height and the width of the first occlusion region as the first size information. The height of the occlusion region A in the panoramic image is h1 and the width of the occlusion region A in the panoramic image is w1, the height of the occlusion region B in the panoramic image is h2 and the width of the occlusion region B in the panoramic image is w2, the height of the occlusion region C in the panoramic image is h3 and the width of the occlusion region C in the panoramic image is w3.

In some embodiments, to determine the second occlusion position information based on the position and the size of the first occlusion region, the media server 103 may accurately determine the second occlusion region in the at least one component image based on the at least one combination coefficient associated with the panoramic image, so that the second occlusion region is accurately occluded and the occlusion effect of the second occlusion region is improved.

The at least one combination coefficient of the panoramic image may include but not limited to the cropping widths of four sides of each component image that forms the panoramic image, the horizontal coordinate of a common line shared by a left component image and a right component image, the vertical coordinate of a common line shared by an upper component image and a lower component image, the maximum offset of the at least one of component image that forms the panoramic image in the vertical direction, a compensation coefficient relating to a distortion of vertical coordinate of the at least one component image with a second occlusion region, a compensation coefficient relating to a distortion of height of at least one component image with a second occlusion region, the maximum image height distortion of the upper boundary of the at least one component image in the first occlusion region, the maximum image height distortion of the lower boundary of the at least one component image in the first occlusion region, the maximum image height distortion of the at least one component image in the first occlusion region, the height of the at least one component image and the width of the at least one component image.

The panoramic image may be generally obtained by capturing component images using a plurality of single-channel cameras of a multi-vision panoramic stitching camera system, and combining the plurality of component images captured by a central processing unit. During the combination process, to have identical physical sizes of the component images in the panoramic image after the combination, the media server 103 may crop four sides of each component image by four cropping widths, wherein a cropping width of a specific side is referred to as the width of the cropped portion of the specific side. The cropping width may be an important parameter used in the determination of the position range of the second occlusion region.

Figure 8:
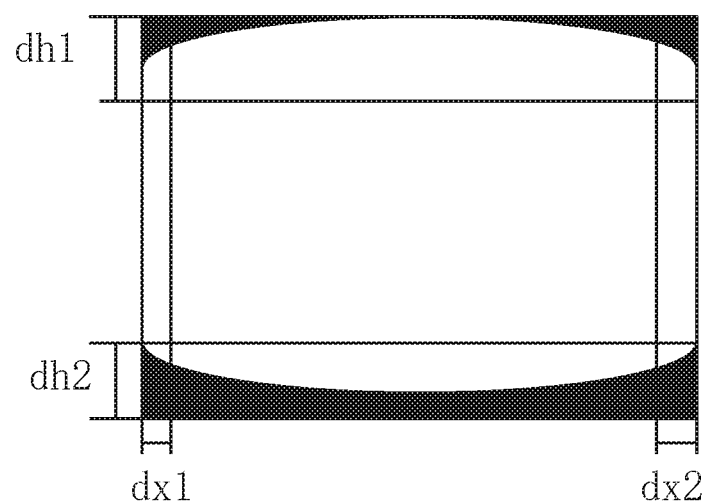
FIG. 8 is a schematic diagram of the cropping width of four sides of a component image that forms the panoramic image according to some embodiments of the present disclosure.

FIG. 8 is a schematic diagram of the cropping width of four sides of a component image that forms the panoramic image according to some embodiments of the present disclosure. As illustrated in FIG. 8, along the horizontal direction, the combining and cropping length of each side varies when the at least one component image forms the panoramic image. The widths of the cropped portions on the left and right sides of the at least one component image are denoted as dx1 and dx2 respectively, and the heights of the cropped portions on the lower left side of the at least one component image are denoted as dh1 and dh2 respectively. The first combining and cropping width of the right component image at a common line shared by a left component image and the right component image may refer to the left cropping width of the right component image and may be expressed as dx1.

Figure 9:
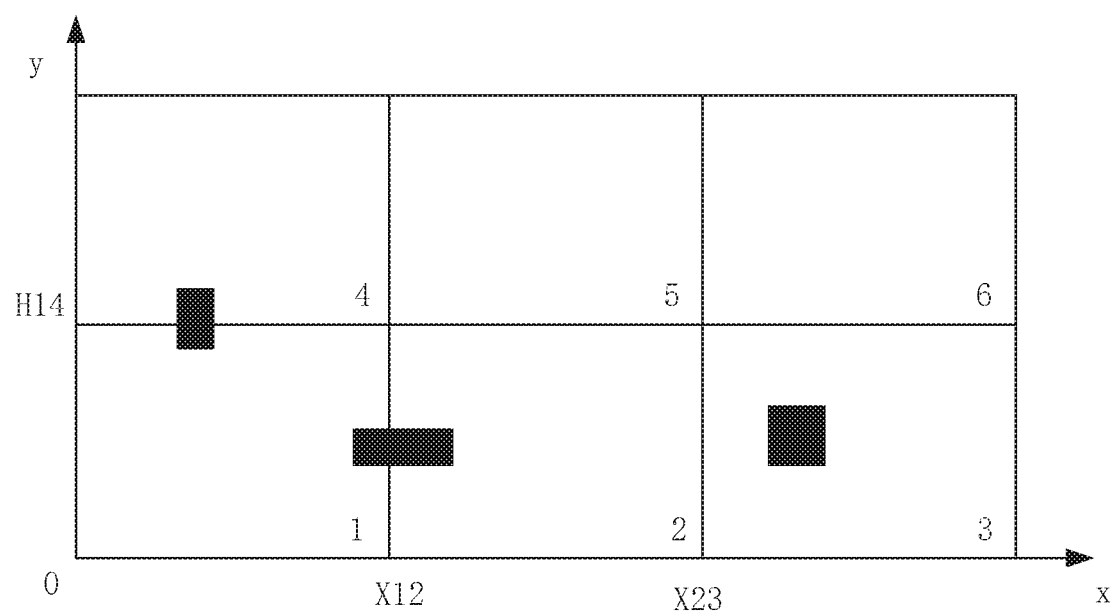
FIG. 9 is a schematic diagram of a common line shared by a left component image and a right component image and a common line shared by an upper component image and a lower component image according to some embodiments of the present disclosure.

A horizontal coordinate of a common line shared by a left component image and a right component image may refer to the horizontal coordinate of the common line shared by the left component image and the right component image in the panoramic image. A vertical coordinate of a common line shared by an upper component image and a lower component image may refer to the vertical coordinate of the common line shared by the upper component image and the lower component image in the panoramic image, FIG. 9 is a schematic diagram of a common line shared by a left component image and a right component image and a common line shared by an upper component image and a lower component image according to some embodiments of the present disclosure. As illustrated in FIG. 9, each of X12 and X23 is the horizontal coordinate of the common line shared by a left component image and a right component image, and H14 is the vertical coordinate of the common line shared by an upper component image and a lower component image.

Figure 10:
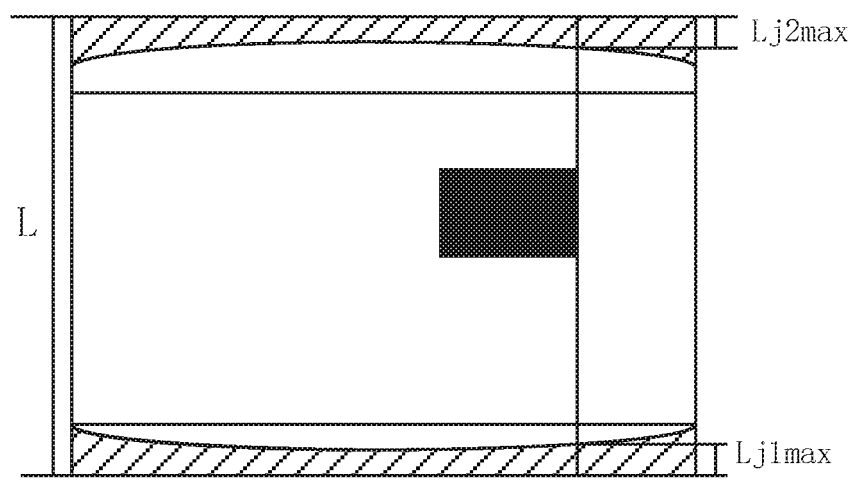
FIG. 10 is a schematic diagram of a maximum image height distortion of a region above a second occlusion region in a component image and a maximum image height distortion of a lower region of the component image according to some embodiments of the present disclosure.

FIG. 10 is a schematic diagram of a maximum image height distortion of a region above a second occlusion region in a component image and a maximum image height distortion of a lower region of the component image according to some embodiments of the present disclosure. As illustrated in FIG. 10, the maximum image height distortion of a component image in the second occlusion region may refer to the maximum value of the sum of the maximum image height distortion of the region below a second occlusion region (also referred to as "the lower region") in a component image and the maximum image height distortion of the region above the second occlusion region (also referred to as "the upper region") in the component image. As illustrated in FIG. 10, for a specific component image, assuming that the total height of the component images is L, the maximum image height distortion of a lower region of the component image in the occlusion region may be Lj1 max, and the maximum image height distortion of an upper region of the component image in the occlusion region may be Lj2 max. The maximum image height distortion of the component image in the second occlusion region may be Lj max, and Lj max may be represented by the following formula:

$$Lj\ max = Max(Lj1\ max + Lj2\ max) \qquad (1);$$

where Lj max is taken as the maximum image height distortion of the component image in the second occlusion region.

For example, assuming that the maximum value of Lj1 max+Lj2 max in FIG. 10 is 3, that is, $$Max(Lj1\ max + Lj2\ max) = 3 \qquad (2),$$

which means the maximum image height distortion Lj max of the component image in the second occlusion region is 3.

In addition, the at least one combination coefficient of the panoramic image may further include the compensation coefficient relating to a distortion of the at least one component image. The compensation coefficient may include a compensation coefficient relating to a distortion of vertical coordinate of at least one component image with a second occlusion region and a compensation coefficient relating to a distortion of height of at least one component image with a second occlusion region, and the compensation coefficient relating to a distortion of vertical coordinate of at least one component image with a second occlusion region is denoted as a and the compensation coefficient relating to a distortion of height of at least one component image with a second occlusion region is denoted as h, wherein both of the compensation coefficients may be used for the second occlusion region in the vertical direction of the at least one component image, and may be a weighted average value calculated based on the weight of the black region in a corresponding region of the second occlusion region in the vertical direction.

In some embodiments, the media server 103 may determine, based on a first vertical coordinate of the first occlusion position information of the first occlusion region, the first height of the first occlusion region, the maximum height distortion of the image corresponding to the upper side of the first occlusion region and the maximum height distortion of the image corresponding to the lower side of the first occlusion region, the compensation coefficient relating to a distortion of vertical coordinate of at least one component image with a second occlusion region. The media server 103 may determine, based on the first height of the first occlusion region and the maximum height distortion of the first image, the compensation coefficient relating to a distortion of height of at least one component image with a second occlusion region.

In some embodiments, as the maximum image height distortion Lj max of a component image with a second occlusion region being equal to the maximum value of the sum of the maximum image height distortion Lj1 max of a lower region below the second occlusion region in the component image and the maximum image height distortion Lj2 max of an upper region above the second occlusion in the component image, the height of the at least one of the plurality of component images being denoted as H in FIG. 11, and the original vertical coordinate of the first occlusion region being y, the media server 103 may determine a and b based on the following formulas:

$$a = \left(\frac{y - Lj1\max}{H - Lj\max}\right) \text{ where } a \leq 1; \quad (3)$$

$$b = \left(\frac{H}{H - Lj\max}\right). \quad (4)$$

The at least one combination coefficient of the panoramic image may be obtained based on a backward calculation of the process of combining the panoramic image.

Figure 11:
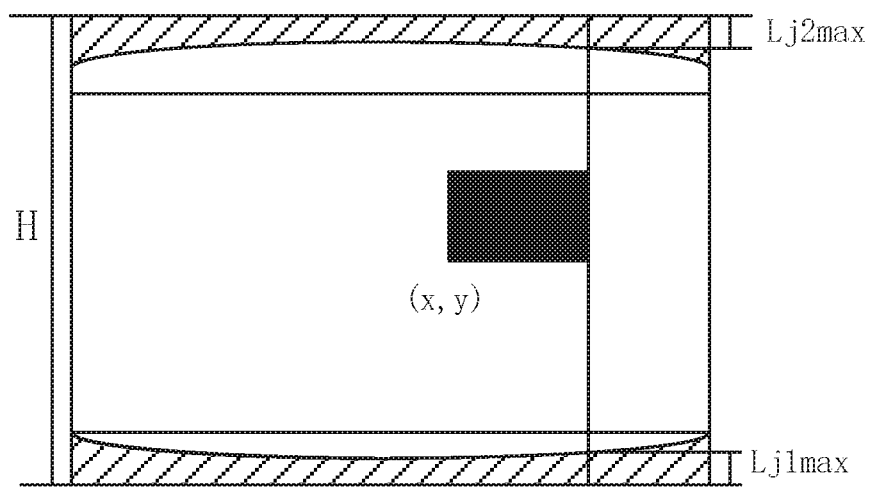
FIG. 11 is a schematic diagram of parameters configured to determine a compensation coefficient relating to a distortion of vertical coordinate of at least one component image with a second occlusion region and compensation coefficient relating to a distortion of height of at least one component image with a second occlusion region in the at least one component image according to some embodiments of the present disclosure.

FIG. 11 is a schematic diagram of parameters configured to determine a compensation coefficient relating to a distortion of vertical coordinate of at least one component image with a second occlusion region and compensation coefficient relating to a distortion of height of at least one component image with a second occlusion region according to some embodiments of the present disclosure.

In some embodiments, as illustrated in FIG. 11, assuming that the maximum value of the sum of the maximum image height distortion Lj1 max of a lower region below a second occlusion region in a component image is 1, the height II of the at least one component image is 50, and the original vertical coordinate y of the first occlusion region is 11, the media server 103 may determine a and h based on the following formulas:

$$a = \left(\frac{y - Lj1\max}{H - Lj\max}\right) = \frac{(11 - 1)}{(50 - 5)} - 0.22; \quad (5)$$

$$b = \left(\frac{H}{H - Lj\max}\right) = \frac{50}{(50 - 5)} = 1.1. \quad (6)$$

Figure 12:
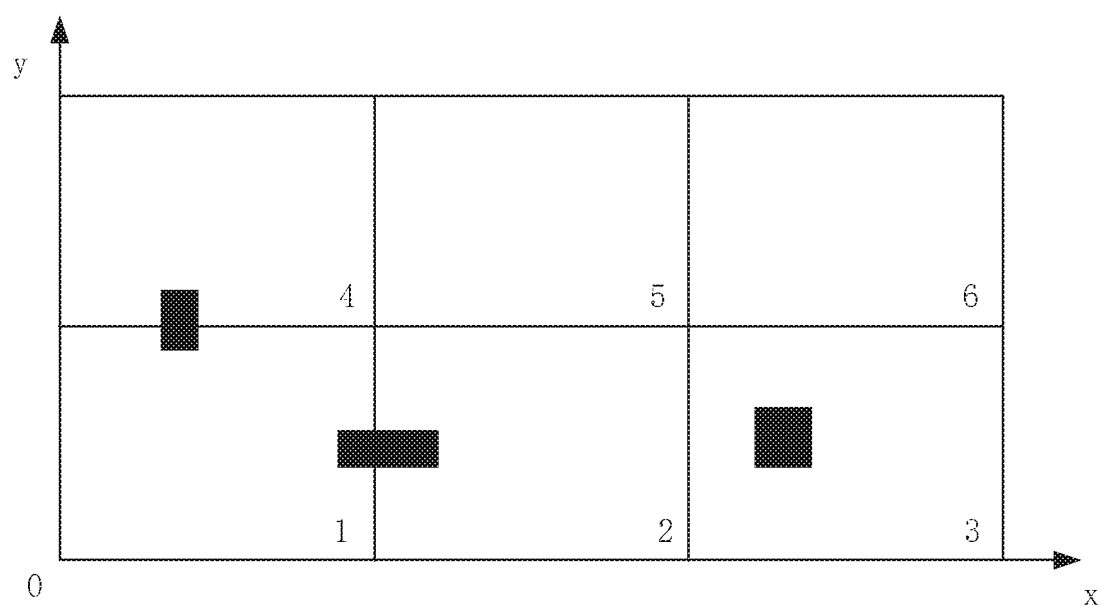
FIG. 12 is a schematic diagram of three categories of the first occlusion region according to some embodiments of the present disclosure.

FIG. 12 is a schematic diagram of three categories of the first occlusion region according to some embodiments of the present disclosure. As illustrated in FIG. 12, the media server 103 may divide the first occlusion region roughly into three categories based on the position of the first occlusion region: a first occlusion region covering a common line shared by a left component image and a right component image of the panoramic image, a first occlusion region covering a common line shared by an upper component image and a lower component image of the panoramic image, and a first occlusion region covering no common lines of the panoramic image.

Merely by way of example, the classification of the first occlusion region may be determined in the following manner.

In some embodiments, if the value of the sum of the first horizontal coordinate (i.e., the horizontal coordinate of the original starting point) of the first occlusion region in the first occlusion position information and the second width of the first occlusion region in the first size information is greater than the value of a second horizontal coordinate of the at least one combination coefficient of the panoramic image, wherein the second horizontal coordinate is of the first occlusion region at the common line of the panoramic image, the first occlusion region may be deemed as covering the common line shared by a left component image and a right component image of the panoramic image; or if the value of the difference between the first vertical coordinate (i.e., the vertical coordinate of the original starting point) of the first occlusion region in the first occlusion position information and the first height of the first occlusion region in the first size information is less than the value of the second vertical coordinate in the at least one combination coefficient of the panoramic image, wherein the second vertical coordinate is of the first occlusion region at the common line of the panoramic image, the first occlusion region may be deemed as covering the common line shared by an upper component image and a lower component image of the panoramic image; or if the value of the sum of the first horizontal coordinate and the second width is greater than the second horizontal coordinate, and the value of the difference between the first vertical coordinate and the first height is less than the value of the second vertical coordinate, the occlusion region may be deemed as not covering a common line of the panoramic image.

The classification of the first occlusion region will be described in detail below. To convert the first occlusion region to the corresponding second occlusion region, the media server 103 may need to determine the position of the first occlusion region.

When determining whether the first occlusion region covers the common line shared by a left component image and a right component image of the panoramic image, the media server 103 may add the value of the first horizontal coordinate of the first occlusion region in the first occlusion position information to the value of the second width of the first occlusion region in the first size information, and then compare the value of the sum with the value of the second horizontal coordinate of the at least one combination coefficient of the panoramic image, wherein the second horizontal coordinate of the at least one combination coefficient of the panoramic image is of the first occlusion region at the common line of the panoramic image. If the value of the sum of the first horizontal coordinate of the first occlusion region in the first occlusion position information and the second width of the first occlusion region in the first size information is greater than the value of the second horizontal coordinate of the at least one combination coefficient of the panoramic image, wherein the second horizontal coordinate is of the first occlusion region at the common line of the panoramic image, the media server 103 may determine that the first occlusion region covers the common line shared by a left component image and a right component image of the panoramic image.

Figure 13:
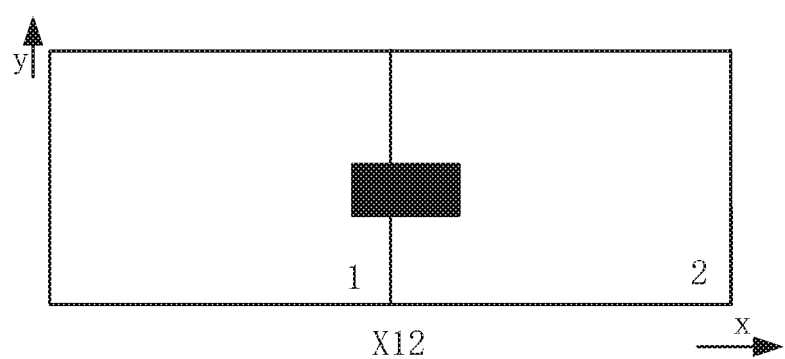
FIG. 13 is a schematic diagram of a first occlusion region covering the common line shared by a left component image and a right component image of the panoramic image according to some embodiments of the present disclosure.

FIG. 13 is a schematic diagram of a first occlusion region covering the common line shared by a left component image and a right component image of the panoramic image according to some embodiments of the present disclosure. In some embodiments, as illustrated in FIG. 13, assuming that the original starting point coordinate of the first occlusion region is (40, 20), the second width of the first occlusion region is 10, and the second horizontal coordinate of the first occlusion region at the common line is 45, the media server 103 may determine that the first occlusion region covers the common line shared by the left component image and the right component image of the panoramic image in response to the result that 40+10>45.

In some embodiments, if the value of the difference between the first vertical coordinate of the first occlusion region in the first occlusion position information and the first height of the first occlusion region in the first size information is less than the value of the second vertical coordinate in the at least one combination coefficient of the panoramic image, wherein the second vertical coordinate is of the first occlusion region at a lower common line of the panoramic image, the first occlusion region may cover the common line shared by an upper component image and a lower component image of the panoramic image.

When determining whether the first occlusion region covers the common line shared by an upper component image and a lower component image of the panoramic image, the media server 103 may subtract the value of the first vertical coordinate of the first occlusion region in the first occlusion position information from the value of the first height of the first occlusion region in the first size information, and then compare the value of the difference with the value of the second vertical coordinate in the at least one combination coefficient of the panoramic image, wherein the second vertical coordinate in the at least one combination coefficient of the panoramic image is of the first occlusion region at the common line of the panoramic image. If the value of the difference between the first vertical coordinate of the first occlusion region in the first occlusion position information and the first height of the first occlusion region in the first size information is less than the value of the second vertical coordinate in the at least one combination coefficient of the panoramic image, wherein the second vertical coordinate is of the first occlusion region at the common line of the panoramic image, the media server 103 may determine that the first occlusion region covers the common line shared by an upper component image and a lower component image of the panoramic image.

Figure 14:
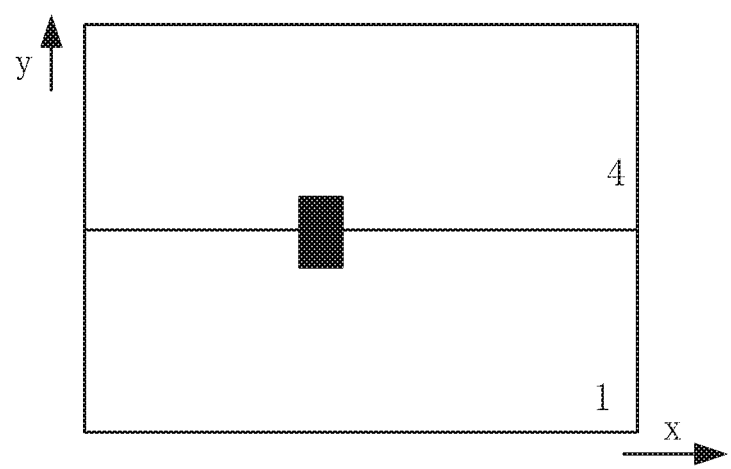
FIG. 14 is a schematic diagram of a first occlusion region covering the common line shared by an upper component image and a lower component image of the panoramic image according to some embodiments of the present disclosure.

FIG. 14 is a schematic diagram of a first occlusion region covering the common line shared by an upper component image and a lower component image of the panoramic image according to some embodiments of the present disclosure. As illustrated in FIG. 14, assuming that the original starting point coordinate of the first occlusion region is (40, 30), the height of the first occlusion region is 10, and the first horizontal coordinate of the first occlusion region at the corresponding upper common line is 25, then the media server 103 may determine that 30−10<25, and determine that the first occlusion region covers the common line shared by an upper component image and a lower component image of the panoramic image.

To classify the first occlusion region, the media server 103 may add the value of the first horizontal coordinate of the first occlusion region in the first occlusion position information to the value of the second width of the first occlusion region in the first size information, and then compare the value of the sum with the value of the second horizontal coordinate of the at least one combination coefficient of the panoramic image, wherein the second horizontal coordinate is of the first occlusion region at the common line of the panoramic image. If the value of the sum of the first horizontal coordinate of the first occlusion region in the first occlusion position information and the second width of the first occlusion region in the first size information is less than or equal to the value of the second horizontal coordinate of the at least one combination coefficient of the panoramic image, wherein the second horizontal coordinate is of the first occlusion region at the common line of the panoramic image, the media server 103 may determine that the first occlusion region does not cover the common line shared by a left component image and a right component image of the panoramic image. Additionally or alternatively, the media server 103 may determine the difference between the value of the first vertical coordinate of the first occlusion region in the first occlusion position information and the value of the first height of the first occlusion region in the first size information, and then compare the value of the difference with the value of the second vertical coordinate in the at least one combination coefficient of the panoramic image, wherein the second vertical coordinate is of the first occlusion region at a common line of the panoramic image. When the value of the difference between the first vertical coordinate and the first height is greater than or equal to the value of the second vertical coordinate in the at least one combination coefficient of the panoramic image, wherein the second vertical coordinate is of the first occlusion region at the common line of the panoramic image, the media server 103 may determine that the first occlusion region does not cover the common line shared by an upper component image and a lower component image of the panoramic image.

Different positions of the first occlusion region will be described in detail below.

In some embodiments, the first occlusion region may correspond to at least two second occlusion regions in at least two component images, wherein the at least two component images may be a left component image and a right component image of the panoramic image sharing the common line. In this way, it may be necessary to calculate the corresponding portions of the first occlusion region on the left and right sides of the common line, respectively.

In some embodiments, the media server 103 may determine the horizontal coordinate and the vertical coordinate of the second occlusion region in the second occlusion position information based on the position of the first occlusion region, the first occlusion position information and the at least one combination coefficient.

In some embodiments, if the first occlusion region covers the common line shared by a left component image and a right component image of the panoramic image, the media server 103 may determine the horizontal coordinate of the second occlusion region in the right component image in the second occlusion position information based on the first horizontal coordinate of the first occlusion region in the first occlusion position information, the second horizontal coordinate in the at least one combination coefficient, and the first combining and cropping width in the at least one combination coefficient, wherein the second horizontal coordinate is of the common line shared by the left component image and the right component image of the panoramic, and first combining and cropping width is of the right component image at the common line shared by the left component image and the right component image of the panoramic image. Additionally or alternatively, the media server 103 may determine the vertical coordinate of the second occlusion region in the left component image in the second occlusion position information based on the height of the at least one component image in the at least one combination coefficient and the compensation coefficient relating to a distortion of vertical coordinate of the left component image in the second occlusion region in the at least one combination coefficient. Further, the media server 103 may determine the vertical coordinate of the second occlusion region in the right component image in the second occlusion position information based on the height of the at least one component image in the at least one combination coefficient and the compensation coefficient relating to a distortion of vertical coordinate of the right component image in the second occlusion region in the at least one combination coefficient.

In some embodiment, the media server 103 may determine the horizontal coordinate and the vertical coordinate of the second occlusion region in the second occlusion position information based on the first occlusion position information, the first size information and the at least one combination coefficient. The media server 103 may convert the original starting point coordinate of the first occlusion region to a corresponding coordinate of the at least one component image.

In some embodiments, the media server 103 may determine the height and the width of the second occlusion region in the second size information based on the position of the first occlusion region, the first occlusion position information, and the at least one combination coefficient.

When determining the height and the width of the second occlusion region in the second size information, if the first occlusion region covers a common line shared by a left component image and a right component image of the panoramic image, the media server 103 may determine the width of the second occlusion region in the right component image in the second occlusion position information based on the first horizontal coordinate, the second width of the first occlusion region in the first size information, the second horizontal coordinate and the first width (i.e., the combining and cropping width of the right component image). The media server 103 may determine the width of the second occlusion region in the left component image in the second occlusion position information based on the first horizontal coordinate, the second width and the third width of the at least one component image in the at least one combination coefficient. Additionally, the media server 103 may determine the height of the second occlusion region in the second occlusion position information based on the first height of the first occlusion region in the first size information, and the compensation coefficient relating to a distortion of height of at least one component image with a second occlusion region in the at least one combination coefficient.

In some embodiment, after determining the horizontal coordinate and the vertical coordinate of the second occlusion region in the second occlusion position information, and converting the original starting point coordinate of the first occlusion region completely to a corresponding coordinate of the at least one component image, the media server 103 may determine the size of the second region, determine the position range of the second occlusion region, and further generate an accurate second region in the at least one component image.

Examples are given below.

Assuming that the original starting point coordinate of the first occlusion region is (x1, y1), the width of the first occlusion region is w1, the height of the first occlusion region is h1, the horizontal coordinate of the common line shared by a left component image and a right component image of the panoramic image is X12, the maximum image height distortion of a lower region of the left component image is $Lj1\ max_{left}$, and the maximum image height distortion of an upper region of the left component image is $Lj2\ max_{left}$, the determined maximum height distortion of the left component image is $Lj\ max_{left}$, the maximum image height distortion of a lower region of the right component image is $Lj1\ max_{right}$, the maximum image height distortion of an upper region of the right component image is $Lj2$ $max_{right}$, the determined maximum height distortion of the right component image is $Lj\ max_{right}$, the width of the at least one component image is W, the height of the at least one component image is H, and the cropping width of the right component image is dx1.

First, the media server 103 may determine the compensation coefficients relating to a distortion of the at least one component image with a second occlusion region based on the existing data. The media server 103 may determine the compensation coefficient relating to a distortion of the at least one component image in the vertical coordinate in the second occlusion region based on formula (3), and the compensation coefficient relating to a distortion of the at least one component image in height in the second occlusion region based on formula (4).

The media server 103 may further determine the position of the second occlusion region in the left component image. The media server 103 may determine the position of the second occlusion region in the left component image based on the original starting point horizontal coordinate of the first occlusion region x1, the width of the first occlusion region w1 and the width of the at least one component image W.

In response to the determination that the value of the sum of the original starting point horizontal coordinate x1 and the width of the first occlusion region w1 is less than the value of the width of the at least one component image W, the media server 103 may determine that the right boundary of the second occlusion region in the left component image does not reach the right boundary of the left component image, and determine:

the starting point horizontal coordinate of the second occlusion region in the left component image as:

$$Xo1=x1 \qquad (7),$$

the starting point vertical coordinate of the second occlusion region in the left component image as:

$$Yo1=H*a \qquad (8),$$

the width of the second occlusion region in the left component image as:

$$Wo1=w1 \qquad (9),$$

the height of the second occlusion region in the left component image as:

$$Ho1=h1*b \qquad (10).$$

In response to the determination that the value of the sum of the original starting point horizontal coordinate x1 and the width of the first occlusion region w1 is greater than the value of the width of the at least one component image W, the media server 103 may determine that the right boundary of the second occlusion region in the left component image reaches the right boundary of the left component image and the second occlusion region is inside the left component image, and determine the portion of the second occlusion region inside the left component image. The media server 103 may determine the starting point horizontal coordinate of the second occlusion region in the left component image according to formula (7), determine the starting point vertical coordinate of the second occlusion region in the left component image according to formula (8), determine the width of the second occlusion region in the left component image as:

$$Wo1=W-w1 \qquad (11),$$

and determine the height of the second occlusion region in the left component image according to formula (10).

In response to the determination that the value of the original starting point horizontal coordinate x1 is greater than the value of the difference between the horizontal coordinate of the common line shared by the left component image and the right component image X12 and the width of the cropped portion on the right side of the right component images dx2, the media server 103 may determine that the left boundary of the second occlusion region reaches the left boundary in the right component image, and determine the portion of the second occlusion region inside the right component image. The media server 103 may determine the starting point horizontal coordinate of the second occlusion region in the right component image as:

$$Xo2=x1-(X12-dx1) \quad (12),$$

the starting point vertical coordinate of the second occlusion region in the right component image as:

$$Yo2=H*a2 \quad (13),$$

the width of the second occlusion region in the right component image as:

$$Wo2=w1 \quad (14),$$

the height of the second occlusion region in the right component image as:

$$Ho12=h1*b2 \quad (15),$$

wherein a2 denotes the compensation coefficient relating to a distortion of vertical coordinate of a right component image, b2 denotes the compensation coefficient relating to a distortion of height of a right component image.

In response to the determination that the value of the original starting point horizontal coordinate x1 is greater than the value the difference between the horizontal coordinates of the common line shared by the left component image and a right component image X12 and the width of the cropped portion on the right side of the right component images, the media server 103 may determine that the left boundary of the second occlusion region does not reach the left boundary in the right component image, and determine: the starting point horizontal coordinate of the second occlusion region in the right component image as:

$$Xo2=0 \quad (16),$$

the starting point vertical coordinate of the second occlusion region in the right component image according to formula (13), the width of the second occlusion region in the right component image as:

$$Wo2=w1-((X12-dx1)-x1) \quad (17),$$

the height of the second occlusion region in the right component image as:

$$Ho12=h1*b \quad (18).$$

Merely by way of example, assuming that the original starting point coordinate of the first occlusion region is (60, 20), the width of the first occlusion region w1 is 20, the height of the first occlusion region h1 is 10, the coordinate of the common line shared by a left component image and a right component image of the panoramic image is 70, the maximum width of a corresponding black region below the first occlusion region is 3, the width of the at least one component image is 80, the height of the at least one component image is 60, the cropping width of a component image on the right side of a common line is 5, the maximum height distortion of a lower region below the second occlusion region of the left component image is 3, the maximum height distortion of an upper region above the second occlusion region of the left component image is 2, the determined maximum height distortion of the left component image is 5, the maximum height distortion of a lower region below the second occlusion region of the right component image is 1, the maximum height distortion of an upper region above the second occlusion region of the right component image is 4, and the determined maximum height distortion of the right component image is 5.

The media server 103 may determine the compensation coefficients relating to a distortion of the left and right component image based on the existing data. The media server 103 may determine: the compensation coefficient relating to a distortion of vertical coordinate of a left component image as:

$$a1=(y1-Lj1 \max_{left})/(H-Lj \max_{left})=0.31 \quad (19);$$

the compensation coefficient relating to a distortion of height of a left component image as:

$$b1=H/(H-Lj \max_{left})=1.09 \quad (20);$$

the compensation coefficient relating to a distortion of vertical coordinate of a right component image as:

$$a2=(y1-Lj1 \max_{right})/(H-Lj \max_{right})=0.35 \quad (21);$$

and the compensation coefficient relating to a distortion of height of a right component image as:

$$b2=H/(H-Lj1 \max_{right})=1.09 \quad (22).$$

The media server 103 may determine the category of the first occlusion region based on the width of the first occlusion region w1 and the original horizontal coordinate of the first occlusion region x1. In response to the determination that x1+w1=60+20≥80, the media server 103 may determine that the first occlusion region covers the common line shared by a left component image and a right component image of the panoramic image.

The media server 103 may determine that the starting point horizontal coordinate of the second occlusion region in the left component image is $$Xo1=x1=60 \quad (23),$$

the starting point vertical coordinate of the second occlusion region in the left component image is $$Yo1=H*a=18.6 \quad (24),$$

the width of the second occlusion region in the left component image is $$Wo1=W-x1=15 \quad (25),$$

and the height of the second occlusion region in the left component image is $$Ho1=h1*b=10.9 \quad (26).$$

In response to the determination that 60<70−5, the media server 103 may determine that the left boundary of the second occlusion region does not reach the left boundary in the right component image, and determine the portion of the second occlusion region inside the right component image. The media server 103 may determine the starting point horizontal coordinate of the second occlusion region in the right component image according to formula (16), the starting point vertical coordinate of the second occlusion region in the right component image as:

$$Yo2=H*a2=21 \quad (27),$$

the width of the second occlusion region in the right component image as:

$$Wo2=w1-((X12-dx1)-x1)=10 \quad (28),$$

and the height of the second occlusion region in the right component image as:

$$Ho12=h1*b=10.9 \quad (29).$$

As illustrated in FIG. 14, the first occlusion region covers a common line shared by an upper component image and a lower component image of the panoramic image.

In some embodiments, when determining the horizontal coordinate and the vertical coordinate of the second occlusion region in the second occlusion position information based on the position of the first occlusion region, the first occlusion position information and the at least one combination coefficient, the media server 103 may determine the horizontal coordinate of the second occlusion region in the second occlusion position information based on the first horizontal coordinate of the first occlusion region in the first occlusion position information.

The media server 103 may determine the vertical coordinate of the second occlusion region in the upper component image in the second occlusion position information based on the first vertical coordinate of the first occlusion region in the first occlusion position information, the maximum height distortion of the image corresponding to the first occlusion region in the at least one combination coefficient, the maximum height distortion of the image corresponding to the upper side of the first occlusion region in the at least one combination coefficient and the first height of the at least one component image. Alternatively, the media server 103 may determine the vertical coordinate of the second occlusion region in the lower component image in the second occlusion position information based on the first vertical coordinate, the third combining and cropping width of the lower component image in the at least one combination coefficient and the height of the second occlusion region in the upper component image.

In some embodiment, the media server 103 may determine the horizontal coordinate and the vertical coordinate of the second occlusion region in the second occlusion position information based on the first occlusion position information, the first size information and the at least one combination coefficient, converting the original starting point coordinate of the first occlusion region completely to a corresponding coordinate of the at least one component image.

In some embodiment, the media server 103 may determine the height and the width of the second occlusion region in the second size information based on the position of the first occlusion region, the first occlusion position information and the at least one combination coefficient. The media server 103 may determine the height of the second occlusion region in the second size information based on the first width and the vertical coordinate of the second occlusion region in the second occlusion position information. Additionally or alternatively, the media server 103 may determine the height of the second occlusion region in the second size information based on the first width, the maximum height distortion of the first image and the first height.

The media server 103 may determine the width of the second occlusion region in the second occlusion position information based on the second width of the first occlusion region in the first size information.

In some embodiment, after determining the horizontal coordinate and the vertical coordinate of the second occlusion region in the second occlusion position information, and converting the original starting point coordinate of the first occlusion region completely to a corresponding coordinate of the at least one of the plurality of component images, the media server 103 may determine the size of the second region, determine the position range of the second occlusion region, and further generate an accurate second region in the at least one component image.

Assuming that the original starting point coordinate of the first occlusion region is (x2, y2), the width of the first occlusion region is w2, the height of the second occlusion region in the lower component image is h1, the height of the second occlusion region in the upper component image is h2, the height of the first occlusion region is h1+h2, the combining and cropping height of a region below the upper component image is dH1, the combining and cropping height of a region above the lower component image is dH2, the width of the at least one of the plurality of component images is W, the total height of the at least one of the plurality of component images is L, the maximum height distortion of a region below a second occlusion region of the upper component image is $Lj1\ max_{upper}$, the maximum height distortion of a region above a second occlusion region of the upper component image is $Lj2\ max_{upper}$, the determined maximum height distortion of the upper component image is $Lj\ max_{upper}$, the maximum height distortion of a region below a second occlusion region of the lower component image is $Lj1\ max_{lower}$, the maximum height distortion of a region above a second occlusion region of the lower component image is $Lj2\ max_{lower}$, and the determined maximum height distortion of the lower component image is $Lj\ max_{lower}$.

The media server 103 may determine the compensation coefficients relating to a distortion of the upper and lower component image based on the existing data. The media server 103 may determine;
the compensation coefficient relating to a distortion of vertical coordinate of a upper component image with a second occlusion region related to a common line as:

$$a1=(y1-Lj1\ max_{upper})/(H-Lj\ max_{upper})=0.31 \quad (30);$$

the compensation coefficient relating to a distortion of height of a upper component image as:

$$b1=H/(H-Lj\ max_{upper})=1.09 \quad (31);$$

the compensation coefficient relating to a distortion of vertical coordinate of a lower component image with a second occlusion region related to a common line as:

$$a2=(y1-Lj1\ max_{lower})/(H-Lj\ max_{lower})=0.35 \quad (32);$$

and the compensation coefficient relating to a distortion of height of a lower component image with a second occlusion region related to a common line as:

$$b2=H/(H-Lj\ max_{lower})=1.09 \quad (33).$$

The media server 103 may determine the category of the first occlusion region based on the height of the second occlusion region in the lower component image, the height of the second occlusion region in the upper component image, the combining and cropping height of a region below the upper component image and the combining and cropping height of a region above the lower component image.

In response to the determination that h1≥dh1, the media server 103 may determine that the second occlusion region in the upper component image reaches the upper boundary of the upper component image after the first occlusion region being converted to the upper component image.

The media server 103 may determine the starting point horizontal coordinate of the second occlusion region in the upper component image as:

$$X=x2 \quad (34),$$

the starting point vertical coordinate of the second occlusion region in the upper component image as:

$$Y=0 \qquad (35),$$

the width of the second occlusion region in the upper component image as:

$$W=w2 \qquad (36),$$

and the height of the second occlusion region in the upper component image as:

$$H = (h1 + dh1) * \left(\frac{L}{L - Lj\max_{upper}}\right). \qquad (37)$$

In response to the determination that h1<dh1, the media server 103 may determine that the second occlusion region in the upper component image does not reach the upper boundary of the upper component image after the first occlusion region being converted to the upper component image.

The media server 103 may determine the starting point horizontal coordinate of the second occlusion region in the lower component image according to formula (34), the starting point vertical coordinate of the second occlusion region in the lower component image as:

$$Y = \left(\frac{y2 - Lj1\max_{lower}}{L - Lj\max_{lower}}\right) * L, \qquad (38)$$

the width of the second occlusion region in the lower component image according to formula (36), and the height of the second occlusion region in the lower component image as:

$$H = (h1 + dh1 - h2) * \left(\frac{L}{L - Lj\max_{lower}}\right). \qquad (39)$$

In response to the determination that h2≥Dh2, the media server 103 may determine that the second occlusion region in the lower component image reaches the upper boundary of the lower component image after the first occlusion region being converted to the lower component image.

The media server 103 may determine the starting point horizontal coordinate of the second occlusion region in the upper component image according to formula (34), the starting point vertical coordinate of the second occlusion region in the upper component image as:

$$Y = \left(\frac{y - Lj1\max_{upper}}{L - Lj\max_{upper}}\right) * L, \qquad (40)$$

the width of the second occlusion region in the upper component image according to formula (36), and the height of the second occlusion region in the upper component image as:

$$H=L-Y \qquad (41).$$

In response to the determination that h2<dh2, the media server 103 may determine that the second occlusion region in the lower component image does not reach the upper boundary of the lower component image after the first occlusion region being converted to the lower component image.

The media server 103 may determine the starting point horizontal coordinate of the second occlusion region in the lower component image according to formula (34), the starting point vertical coordinate of the second occlusion region in the lower component image as:

$$Y = \left(\frac{y - Lj1\max_{lower}}{L - Lj\max_{lower}}\right) * L, \qquad (42)$$

the width of the second occlusion region in the lower component image according to formula (36), and the height of the second occlusion region in the lower component image as:

$$H = (h1 + h2) * \left(\frac{L}{L - Lj\max_{lower}}\right). \qquad (43)$$

Assuming that the original starting point coordinate of the first occlusion region is (40, 40), the width of the first occlusion region is 10, the height of the first occlusion region in the lower component image is 10, the height of the first occlusion region in the upper component image is 10, the height of the first occlusion region is 20, the combining and cropping height of a lower region below the upper component image is 5, the combining and cropping height of an upper region above the lower component image is 5, the width of the upper and lower component images is 80, the total height of the upper and/or lower component images is 60, the maximum height distortion of a lower region below a second occlusion region of the upper component image is 3, the maximum height distortion of an upper region above a second occlusion region of the upper component image is 2, the determined maximum height distortion of the upper component image is 5, the maximum height distortion of a lower region below a second occlusion region of the lower component image is 1, the maximum height distortion of an upper region above a second occlusion region of the lower component image is 4, and the determined maximum height distortion of the lower component image is 5.

The media server 103 may determine the compensation coefficients relating to a distortion of the upper and lower component image with a second occlusion region based on the existing data. The media server 103 may determine: the compensation coefficient relating to a distortion of vertical coordinate of a upper component image with a second occlusion region related to a common line as:

$$a1=(y2-Lj1\ \max_{upper})/(H-Lj\ \max_{upper})=0.31 \qquad (44);$$

the compensation coefficient relating to a distortion of height of a upper component image with a second occlusion region related to a common line as:

$$b1=H/(H-Lj\ \max_{upper})=1.09 \qquad (45);$$

the compensation coefficient relating to a distortion of vertical coordinate of a lower component image with a second occlusion region related to a common line as:

$$a2=(y2-Lj1\ \max_{lower})/(H-Lj\ \max_{lower})=0.35 \qquad (46);$$

and the compensation coefficient relating to a distortion of height of a lower component image with a second occlusion region related to a common line according to formula (33).

The media server 103 may determine the category of the first occlusion region based on the height of the second occlusion region in the lower component image, the height of the second occlusion region in the upper component image, the combining and cropping height of a region below the upper component image and the combining and cropping height of a region above the lower component image.

The height of the second occlusion region in the lower component image is 10 and the combining and cropping height of a region below the upper component image is 10. As the value of the height of the second occlusion region in the lower component image is equal to the value of the combining and cropping height of a region below the upper component image, the media server 103 may determine that the lower boundary of the second occlusion region in the upper component image reaches the lower boundary of the upper component images, wherein the second occlusion region in the upper component image reaches the upper boundary of the upper component images. The media server 103 may determine the starting point horizontal coordinate of the second occlusion region in the upper component image as:

$$X = x2 = 40 \qquad (47),$$

the starting point vertical coordinate of the second occlusion region in the upper component image according to formula (35), the width of the second occlusion region in the upper component image as:

$$W = w2 = 10 \qquad (48),$$

and the height of the second occlusion region in the upper component image as:

$$H = (h1 + dh1) * \left(\frac{L}{L - Lj\max_{upper}}\right) = 16.35. \qquad (49)$$

According to that the height of the second occlusion region in the upper component image of the panoramic image h2 is 10 and the combining and cropping height of a region above the lower component image is 5, the media server 103 may determine that the upper boundary of the second occlusion region in the lower component image reaches the upper boundary of the lower component image.

The media server 103 may determine the starting point horizontal coordinate of the second occlusion region in the lower component image according to formula (47), the starting point vertical coordinate of the second occlusion region in the lower component image as:

$$Y = \left(\frac{y - Lj1\max_{lower}}{L - Lj\max_{lower}}\right) * L = 42.55, \qquad (50)$$

the width of the second occlusion region in the lower component image according to formula (48), and the height of the second occlusion region in the lower component image as:

$$H = (h1 + h2) * \left(\frac{L}{L - Lj\max_{lower}}\right) = 10. \qquad (51)$$

Figure 15:
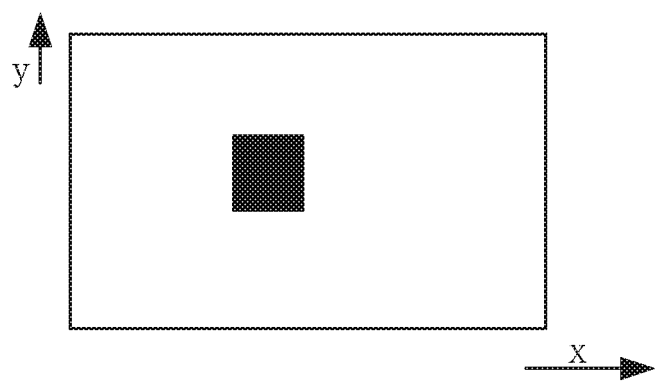
FIG. 15 is a schematic diagram of a first occlusion region covering no common line of the panoramic image according to some embodiments of the present disclosure.

FIG. 15 is a schematic diagram of a first occlusion region covering no common line of the panoramic image according to some embodiments of the present disclosure. As illustrated in FIG. 15, the first occlusion region does not cover a common line of the panoramic image.

In some embodiments, in response to the determination that the first occlusion region does not cover the common line of the panoramic image, the media server 103 may determine the horizontal coordinate of the second occlusion region in the second occlusion position information based on the first horizontal coordinate of the first occlusion region in the first occlusion position information, the second width of the first occlusion region in the first size information, the second horizontal coordinate of the common line shared by a left component image and a right component image of the panoramic image in the at least one combination coefficient and the first combining and cropping width in the at least one combination coefficient, wherein the first combining and cropping width is of a corresponding component image at the common line shared by a left component image and a right component image.

The media server 103 may determine the vertical coordinate of the second occlusion region in the corresponding component image in the second occlusion position information based on the height of the corresponding component image in the at least one combination coefficient and the compensation coefficients relating to a distortion of vertical coordinate of the corresponding component image in the at least one combination coefficient.

In some embodiment, the media server 103 may determine the horizontal coordinate and the vertical coordinate of the second occlusion region in the second occlusion position information based on the first occlusion position information, the first size information and the at least one combination coefficient, converting the original starting point coordinate of the first occlusion region completely to the at least one of the plurality of component images.

In some embodiment, the media server 103 may determine the height and the width of the second occlusion region in the second size information based on the position of the first occlusion region, the first occlusion position information and the at least one combination coefficient. The media server 103 may determine the height of the second occlusion region in the corresponding component image in the second size information based on the first height of the first occlusion region in the first size information and the compensation coefficient relating to a distortion of height of the corresponding component image in the at least one combination coefficient.

The media server 103 may determine the width of the second occlusion region in the corresponding component image in the second size information based on the second width.

In some embodiment, the media server 103 may determine the size of the second region after determining the height and the width of the second occlusion region in the second size information based on the position of the first occlusion region, the first occlusion position information, and the at least one combination coefficient, determine the position range of the second occlusion region, and further generate an accurate second region in the at least one component image.

In some embodiments, if the media server 103 determines that the second occlusion region is inside one of the at least one of component image, and there is no need to consider the common line during the calculation of conversion of the first occlusion region to the at least one component image, the media server 103 may determine the second occlusion position information and the second size information.

Assuming that the original starting point coordinate of the first occlusion region is (x3, y3), the coordinate of a left common line of the at least one of the plurality of component images corresponding to the first occlusion region is X23, the height of the first occlusion region is h3, the width of the first occlusion region is w3, the left cropping width of the at least one of the plurality of component images corresponding to the first occlusion region is dx3, the width of the at least one component image is W, the total height of the at least one component image is H, the maximum image height distortion of a region below a second occlusion region in a component image is Lj1 max, the maximum image height distortion of a region above a second occlusion region in a component image is Lj2 max, and the determined maximum image height distortion of the component image is Lj max.

The media server 103 may determine the compensation coefficients relating to a distortion of the left and right component image based on the existing data. The media server 103 may determine:
the compensation coefficient relating to a distortion of vertical coordinate of a component image as:

$$a1 = \left(\frac{y2 - Lj1\max}{H - Lj\max}\right), \tag{51}$$

and the compensation coefficient relating to a distortion of height of a component image as:

$$b1 = \left(\frac{H}{H - Lj\max}\right). \tag{52}$$

Subsequently, the coordinates of the occlusion region are converted as follows:
The media server 103 may convert the first occlusion region to the second occlusion region as following:
the starting point horizontal coordinate of the second occlusion region in the component image is $$X3 = x3 - X23 + dx3 \tag{53},$$

the starting point vertical coordinate of the second occlusion region in the component image is $$Y3 = (y3 + dy3)^* a3 \tag{54},$$

the width of the second occlusion region in the component image is $$W3 = w3 \tag{55},$$

and the height of the second occlusion region in the component image is $$H3 = h3 * b3 \tag{56}.$$

In some embodiments, assuming that the original starting point coordinate of the first occlusion region is (40, 30), the coordinate of a left common line of the at least one of the plurality of component images corresponding to the first occlusion region is 10, the width of the first occlusion region is 10, the height of the first occlusion region is 10, the left cropping width of the at least one of the plurality of component images corresponding to the first occlusion region is 10, the width of the at least one of the plurality of component images is 80, the total height of the at least one of the plurality of component images is 60, the maximum image height distortion of a region below a second occlusion region in a component image is 3, the maximum image height distortion of a region above a second occlusion region in a component image is 2, and the determined maximum image height distortion of the component image with the second occlusion region is 5.

The media server 103 may determine the compensation coefficients relating to a distortion of the left and right component image based on the existing data. The media server 103 may determine: the compensation coefficient relating to a distortion of vertical coordinate of a component image as:

$$a1 = \left(\frac{y2 - Lj1\max}{H - Lj\max}\right) = 0.31, \tag{57}$$

and the compensation coefficient relating to a distortion of height of a component image as:

$$b1 = \left(\frac{H}{H - Lj\max}\right) = 1.09. \tag{58}$$

Subsequently, the media server 103 may convert the first occlusion region to the second occlusion region as following:
the starting point horizontal coordinate of the second occlusion region in the component image is $$X3 = x3 - X23 + dx3 = 40 \tag{59},$$

the starting point vertical coordinate of the second occlusion region in the component image is $$Y3 = (y3 + dy3)^* a3 = 18.6 \tag{60},$$

the width of the second occlusion region in the component image is $$W3 = w3 = 10 \tag{61},$$

and the height of the second occlusion region in the component image is $$H3 = h3 * b3 = 10.9 \tag{62}.$$

In some embodiments, when converting the first occlusion region to the corresponding second occlusion region(s), the media server 103 may determine the second occlusion region in the at least one component image without cropping based on the position and size of the first occlusion region, and the at least one combination coefficient. As the media server 103 may correct the second occlusion region based on the at least one combination coefficient, the second occlusion region may be generated accurately in the corresponding component image with an improved occlusion effect.

The media server 103 may determine the compensation coefficients relating to a distortion of the at least one component image before determining the coordinate and the size information of the second occlusion region in the corresponding component image, or determine the compensation coefficients using corresponding parameters during the determination of the coordinate and the size information of the second occlusion region in the corresponding component image without solving the compensation coefficients alone.

Figure 16:
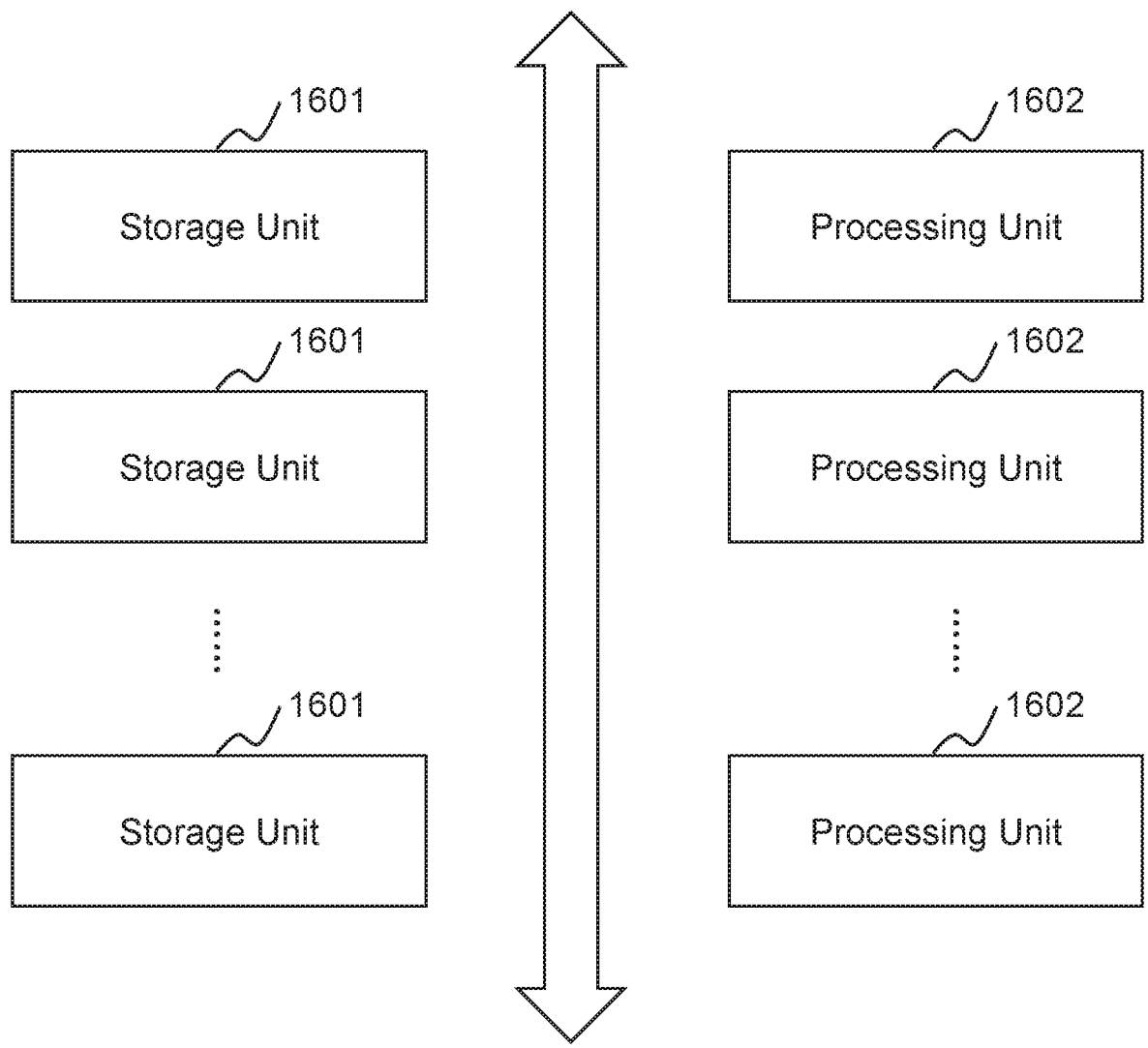
FIG. 16 is a block diagram of an exemplary video processing device according to some embodiments of the present disclosure.

FIG. 16 is a block diagram of an exemplary video processing device according to some embodiments of the present disclosure. The video processing device 1600 may include at least one storage unit 1601 and a processing unit 1602.

The storage unit 1601 may include a set of instructions, when the set of instructions being executed by the processing unit 1602, the processing unit 1602 may be directed to perform the following operations.

The processing unit 1602 may determine a parameter indicating the second occlusion position information of a second occlusion region in at least one of a plurality of component images and/or a parameter indicating the second size information of the second occlusion region in the at least one of the plurality of component images. The processing unit 1602 may determine at least one position of the second occlusion region in the at least one of the plurality of component images based on the second occlusion position information and the second size information. The processing unit 1602 may generate the second occlusion region in the at least one of the plurality of component images.

In some embodiments, the processing unit 1602 may be configured to determine the horizontal coordinate and/or the vertical coordinate of the second occlusion region in the second occlusion position information. The processing unit 1602 may be configured to determine the height and/or the width of the second occlusion region in the second size information.

Figure 17:
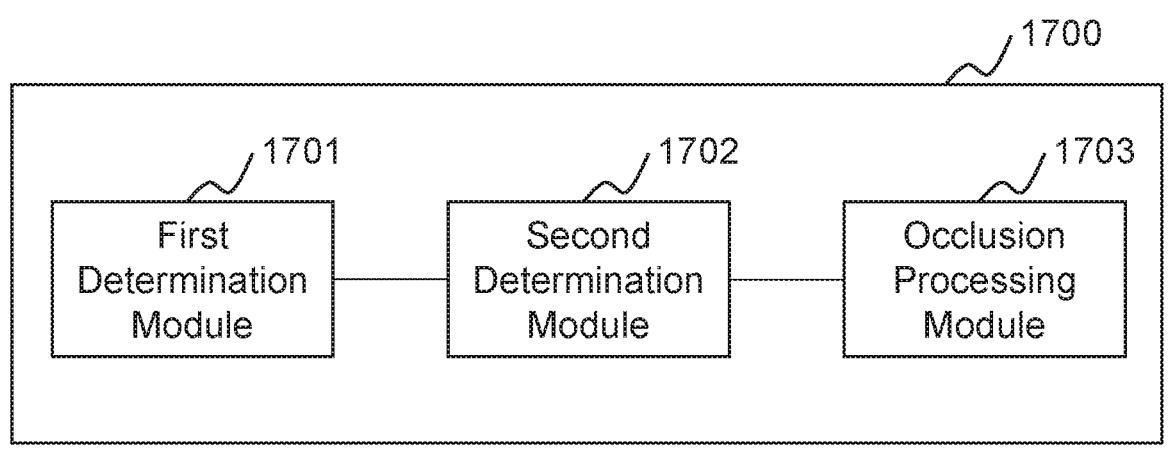
FIG. 17 is a block diagram of an exemplary video processing device according to some embodiments of the present disclosure.

FIG. 17 is a block diagram of an exemplary video processing device according to some embodiments of the present disclosure. The video processing device 1700 may include a first determination module 1701, a second determination module 1702 and an occlusion processing module 1703.

The first determination module 1701 may be configured to determine a parameter indicating the second occlusion position information of a second occlusion region in at least one of a plurality of component images and/or a parameter indicating the second size information of the second occlusion region in the at least one of the plurality of component images based on various parameters, such as, a parameter indicating the first occlusion position information of a first occlusion region in a panoramic image, a parameter indicating the first size information of the first occlusion region in the panoramic image, and at least one combination coefficient. The panoramic image may be captured and formed based on multi-channel video signals.

The occlusion processing module 1703 may be configured to generate the second occlusion region in the at least one of the plurality of component images.

Figure 18:
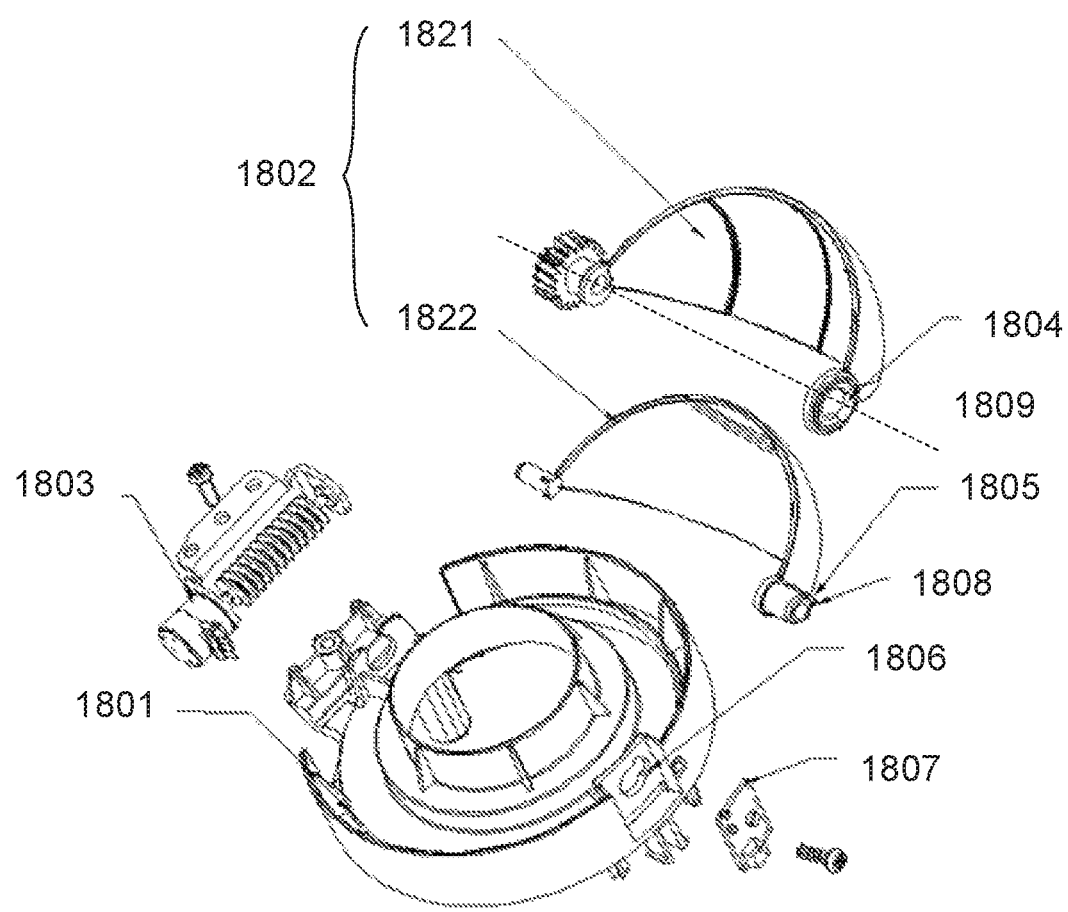
FIG. 18 is a schematic structure of a lens sheltering device according to some embodiments of the present disclosure.

FIG. 18 is a schematic structure of a lens sheltering device 1800 according to some embodiments of the present disclosure. As shown, the lens sheltering device 1800 may include a sheltering sheet stand 1801, a sheltering sheet group 1802 and an actuating device 1803. In some embodiments, the sheltering sheet stand may also be referred to as a holder, the sheltering sheet group may also be referred to as a sheltering device.

The sheltering sheet stand 1801 may include an accommodation space for accommodating the sheltering sheet group 1802 when it is in an opening position. The sheltering sheet stand 1801 may also have an aperture which let through a camera lens.

Figure 19:
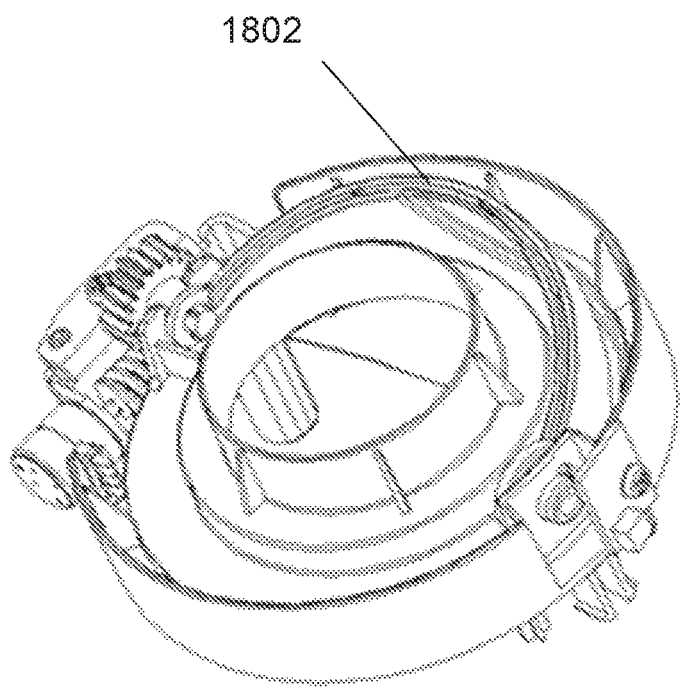
FIG. 19 is a schematic structure of a sheltering sheet group on an opening status according to some embodiments of the present disclosure.
Figure 20:
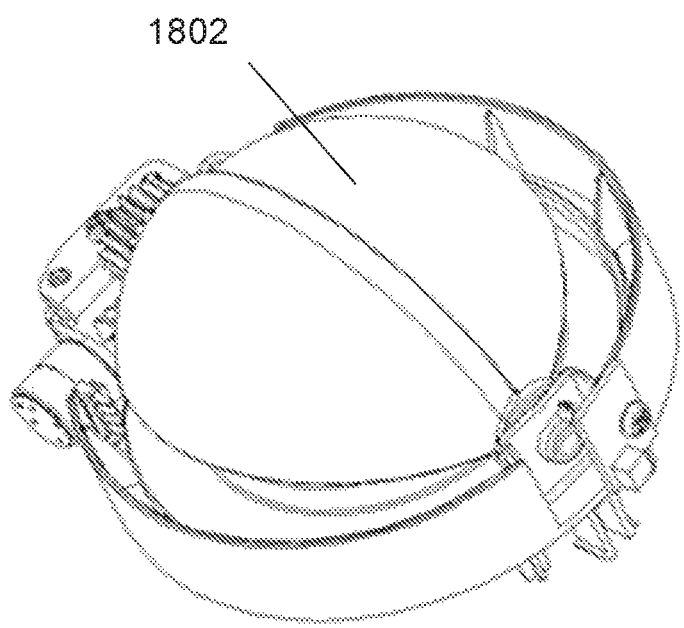
FIG. 20 is a schematic structure of a sheltering sheet group on a sheltering status according to some embodiments of the present disclosure.

The sheltering sheet group 1802 may include a plurality of sheltering sheets overlapping each other. The sheltering sheet group 1802 may include an outer sheltering sheet 1821 (also referred to as an outer sheet) rotationally mounted on the sheltering sheet stand 1801. The outer sheltering sheet 1821 may be pivotable around a first axis 1809. A transmission mechanism may be arranged between the outer sheltering sheet 1821 and an inner sheltering sheet 1822 (also referred to as an inner sheet) so that the inner sheltering sheet 1822 and the outer sheltering sheet 1821 may be folded or unfolded under the drive of the outer sheltering sheet 1821. FIG. 19 is a schematic structure of a sheltering sheet group on an open status according to some embodiments of the present disclosure, FIG. 20 is a schematic structure of a sheltering sheet group on a sheltering status according to some embodiments of the present disclosure. As illustrated in FIG. 19 and FIG. 20, the sheltering sheet group 1802 may have an opening position (also referred to as an open status) and a closing position (also referred to as a sheltering status). When the sheltering sheet group 1802 is in the opening position, the plurality of sheltering sheets may be folded and overlapping each other. The folded sheltering sheets may be packed up in the accommodation space to unblock the view of the camera lens. When the sheltering sheet group 1802 is in the closing position, the plurality of sheltering sheets may be unfolded to form a sheltering plate to block the view of the camera lens.

The actuating device 1803 may be mounted on the sheltering sheet stand 1801, and in transmission connection with the outer sheltering sheet 1821 in the sheltering sheet group 1802. The actuating device 1803 may drive the rotation of the outer sheltering sheet 1821 through, e.g., a gear, around the first axis 1809.

In the lens sheltering device, referring to FIG. 19, when the sheltering sheet group 1802 is in the opening position, the sheltering sheet group 1802 may be placed in the accommodation space of the sheltering sheet stand 1801 to unblock the view of the camera lens extending from the aperture of the sheltering sheet stand 1801. When the sheltering sheet group 1802 is switched to the closing position from the opening position, the actuating device 1803 may drive the outer sheltering sheet 1821 which is arranged in the outermost layer in the sheltering sheet group 1802 and in transmission connection with the actuating device 1803 to rotate around the first axis 1809. Then, the outer sheltering sheet 1821 may drive an adjacent inner sheltering sheet 1822 to rotate via the transmission mechanism. For every two adjacent sheltering sheets of the plurality of sheltering sheets overlapping each other in the sheltering sheet group 1802, the actuating device 1803 may complete the operation of switching the sheltering sheet group 1802 from the opening position to the closing position until the outer sheltering sheet 1821 and the inner sheltering sheet 1822 are unfolded. Referring to FIG. 20, two sheltering sheets are unfolded to form the sheltering plate to shelter the camera lens. When the sheltering sheet group 1802 is switched to the opening position from the closing position, the actuating device 1803 may drive the outermost sheltering sheet (e.g., the outer sheltering sheet 1821) which is arranged in the outermost layer in the sheltering sheet group 1802 and in transmission connection with the actuating device 1803 to reversely rotate around the first axis 1809. For every two adjacent sheltering sheets of the plurality of sheltering sheets overlapping each other in the sheltering sheet group 1802, the actuating device 1803 may complete the operation of switching the sheltering sheet group 1802 from the closing position to the opening position until the outer sheltering sheet 1821 and the inner sheltering sheet 1822 are folded. The folded sheltering sheets are superimposed to each other and packed up in the accommodation space to unblock the view of the camera lens.

In some embodiments, the lens sheltering device 1800 disclosed in the present disclosure may not need to be powered off when it is in use. The way of arranging the sheltering sheet group 1802 formed by the plurality of sheltering sheets overlapping each other in the accommodation space of the sheltering sheet stand 1801 when it is in the opening position not only reduces the space occupied by the sheltering sheet group 1802, but also guarantees the integrity of the view of the camera lens, and thus, is applicable to the camera lens with all kinds of view angles. In addition, the sheltering plate formed by the plurality of sheltering sheets in the closing position may block the view of the camera lens, thereby forming a protection for the camera lens, prolonging the service life of the camera lens, simplifying the operation process for a user, and facilitating a simple and easy control process.

Therefore, the lens sheltering device, with a contractible sheltering sheet group, contributes to achieving the physical sheltering of the lens in the case that the lens is not powered off.

While in use, the lens is sheltered such that an effect of sheltering the view of a monitoring screen equipped with the lens is achieved. In the whole process, the relative position of the lens may not change, and no plate division treatment is performed to a photosensitive element and a mainboard, thereby saving the cost. Moreover, such way facilitates the distinction observed by naked eyes of a front-end personnel, thereby improving the reliability and safety.

Figure 21:
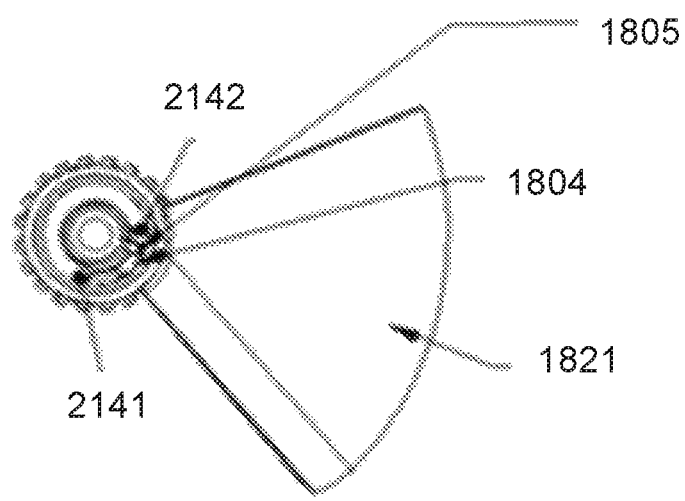
FIG. 21 is a schematic structure of a limiting mechanism formed on the outer sheltering sheet when the sheltering sheet group is on an opening status according to some embodiments of the present disclosure.
Figure 22:
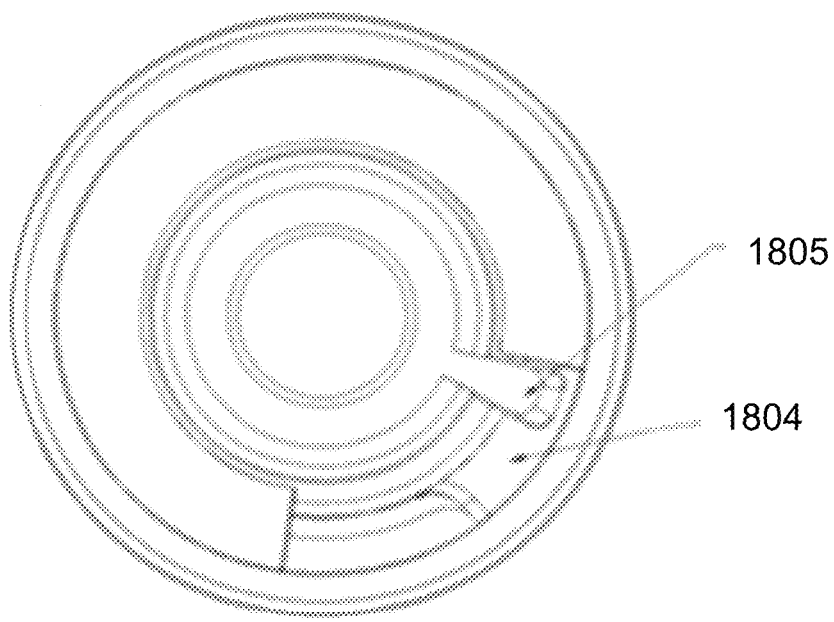
FIG. 22 is a schematic structure of a partially enlarged limiting mechanism formed on the outer sheltering sheet when the sheltering sheet group is on an opening status according to some embodiments of the present disclosure.

FIG. 21 is a schematic structure of a limiting mechanism formed on the outer sheltering sheet when the sheltering sheet group is in an opening status according to some embodiments of the present disclosure. FIG. 22 is a schematic structure of a partial enlarged limiting mechanism formed on the outer sheltering sheet when the sheltering sheet group is in an opening status according to some embodiments of the present disclosure.

In the present disclosure, referring to FIG. 21 and FIG. 22, for every two adjacent sheltering sheets of the sheltering sheet group 1802, the inner sheltering sheet 1822 may be hinged with the outer sheltering sheet 1821 through a rotating shaft, and the transmission mechanism between every two adjacent sheltering sheets may include: a first driving surface 2141 and a second driving surface 2142 formed on the outer sheltering sheet 1821. The first driving surface 2141 and the second driving surface 2142 may be arranged along a moving path of the outer sheltering sheet 1821 pointing from the opening position to the close position. The transmission mechanism may further include a stopper 1805 formed on the inner sheltering sheet 1822. The stopper may be arranged between the first driving surface 2141 and the second driving surface 2142. When the outer sheltering sheet 1821 moves from the opening position to the closing position, the stopper 1805 may cooperate with the first driving surface 2141 to drive the inner sheltering sheet 1822 to move from the opening position to the closing position. When the outer sheltering sheet 1821 moves from the closing position to the opening position, the stopper 1805 may cooperate with the second driving surface 2142 to drive the inner sheltering sheet 1822 to move from the closing position to the opening position.

Specifically, when the outer sheltering sheet 1821 moves from the opening position to the closing position, the first driving surface 2141 on the outer sheltering sheet 1821 may push the stopper 1805 (e.g., a limiting rib) on the inner sheltering sheet 1822 to drive the inner sheltering sheet 1822 to move from the opening position to the closing position. When the outer sheltering sheet 1821 moves from the closing position to the opening position, the second driving surface 2142 on the outer sheltering sheet 1821 may reversely push the stopper 1805 on the inner sheltering sheet 1822 to drive the inner sheltering sheet 1822 to move from the closing position to the opening position.

It should be noted that, the distance between the first driving surface 2141 and the second driving surface 2142 may be related to an open angle that the outer sheltering sheet 1821 between every two adjacent sheltering sheets pivots around the first axis 1809 relative to the inner sheltering sheet 1822. The distance may be set according to the width of the sheltering sheet along the direction of the rotation, so that the two adjacent sheltering sheets may completely block the view of the camera lens in the closing position, without a blocking gap that causes incomplete sheltering. The width of the sheltering sheet along the direction of the rotation may be 0.5 cm, 1 cm, 1.5 cm, 2 cm, 3 cm, 5 cm, etc.

In some embodiments, in the sheltering sheet group 1802, the axial lead of the rotating shaft between every two adjacent sheltering sheets may coincide with the first axis 1809.

Specifically, with such structure, the rotation angle and the rotation distance of each sheltering sheet during the rotation may be fixed. When setting the bending radian of the sheltering sheets, the minimum radian may be set based on the position and the bulge degree of the camera lens on the sheltering sheet stand to guarantee that the camera lens is not touched or scratched in the rotation process when each sheltering sheet rotates around the first axis 1809.

It should be noted that, with the above structure, the protection for the camera lens is formed when the sheltering sheet group 1802 is in the closing position, thereby guaranteeing the surface smoothness of the camera lens, enabling that images shot by the camera is clear, and prolonging the service life of the camera lens.

Referring to FIG. 21, the outer sheltering sheet 1821 may be equipped with a first notch structure 1804. The first driving surface 2141 and the second driving surface 2142 may form two sides of the first notch structure 1804. The stopper 1805 may be arranged on the inner sheltering sheet 1822 and in the form of a limiting rib.

It should be noted that, since actions of the inner sheltering sheet 1822 related to the opening position and the closing position is achieved via the push of the stopper 1805 by the first driving surface 2141 and the second driving surface 2142 on the outer sheltering sheet 1821, the whole device has good stability in the driving process, thereby prolonging the service life of the outer sheltering sheet 2141, and avoiding the failure of the function of the driving surface and the limiting rib under repeated operations.

In addition, with the structure disclosed in the present disclosure, the whole device may have a simple and compact structure, thereby facilitating the miniaturization of the lens sheltering device.

In some embodiments, a limiting mechanism may be formed, among the inner sheltering sheet 1822, the outer sheltering sheet 1821 and the sheltering sheet stand 1801, for limiting the inner sheltering sheet 1822 when the sheltering sheet group 1802 is in the opening position and/or the closing position.

The limiting mechanism may determine a restriction position in the accommodation space of the sheltering sheet group 1802 when the sheltering sheet group 1802 is in the opening position, thereby avoiding that the actuating device 1803 keeps driving the outer sheltering sheet 1821 after the plurality of sheltering sheets have been superimposed and packed in the accommodation space. In addition, the limiting mechanism may restrict the position of the sheltering plate formed by the plurality of sheltering sheets when the sheltering sheet group 1802 is in the closing position, thereby enabling the sheltering plate to completely block the view of the camera lens.

Figure 23:
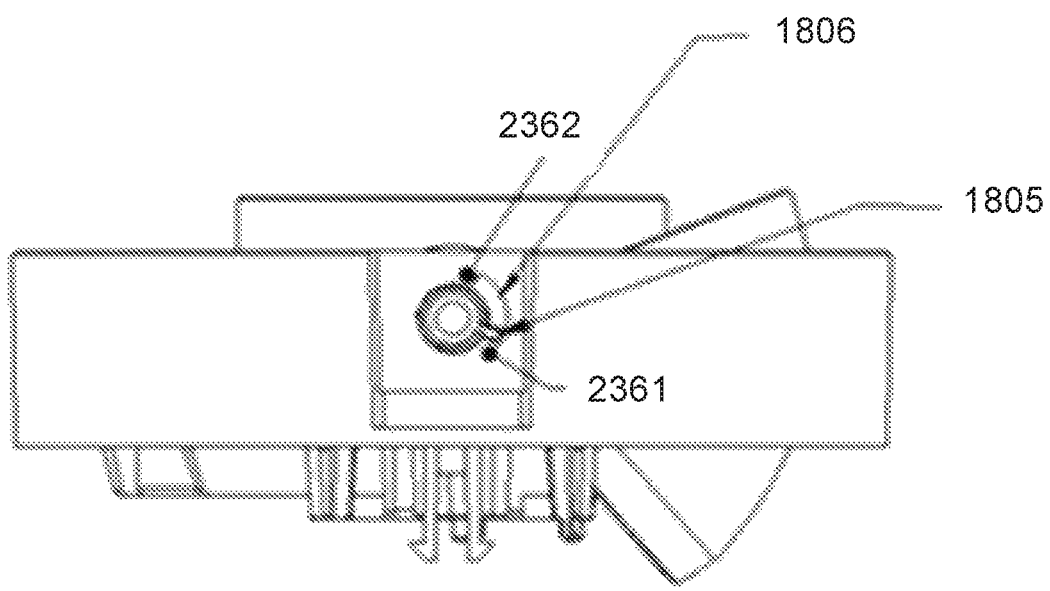
FIG. 23 is a schematic structure of a stopper formed on the sheltering sheet stand when the sheltering sheet group is on an opening status according to some embodiments of the present disclosure.
Figure 24:
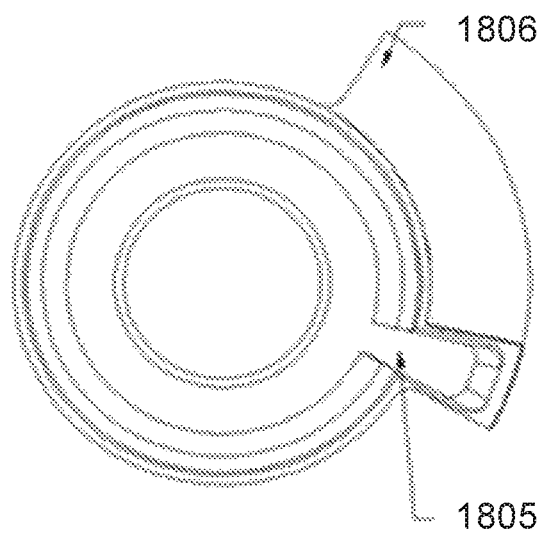
FIG. 24 is a schematic structure of a partial enlarged stopper formed on the sheltering sheet stand when the sheltering sheet group is on an opening status according to some embodiments of the present disclosure.

FIG. 23 is a schematic structure of a limiting mechanism formed on the sheltering sheet stand when the sheltering sheet group is n an opening status according to some embodiments of the present disclosure. FIG. 24 is a schematic structure of a partial enlarged limiting mechanism formed on the sheltering sheet stand when the sheltering sheet group is in an opening status according to some embodiments of the present disclosure.

In some embodiments, referring to FIG. 21 through FIG. 24, the limiting mechanism may include the first driving surface 2141 and the second driving surface 2142, a second notch structure 1806 formed on the sheltering sheet stand 1801. A third driving surface 2261 and a fourth driving surface 2362 may form two sides of the second notch structure 1806.

Along the moving path of the inner sheltering sheet 1822 from the opening position to the close position, the stopper 1805 may be moveable between the third driving surface 2361 and the fourth driving surface 2362. When the inner sheltering sheet 1822 is in the opening position, the second driving surface 2142 and the third driving surface 2361 may form a first limiting gap to restrict the position of the stopper 1805. When the inner sheltering sheet 1822 is in the closing position, the first driving surface 2141 and the fourth driving surface 2362 may form a second limiting gap to restrict the position of the stopper 1805.

Figure 25A:
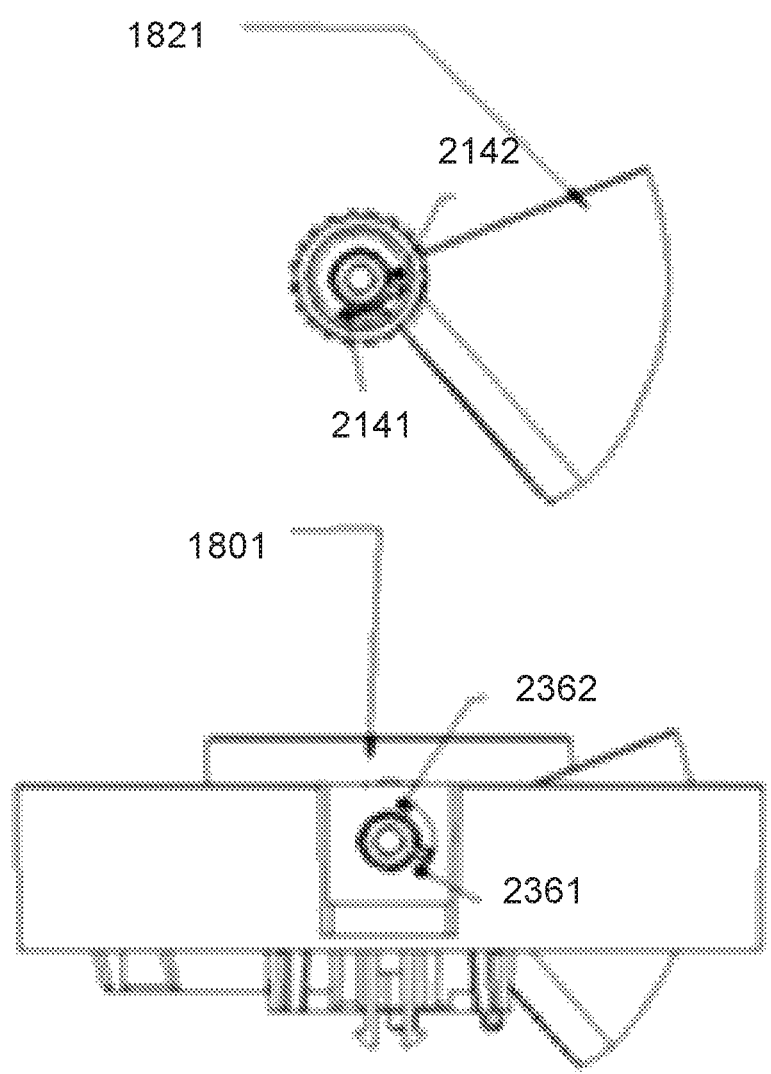
FIGS. 25A to 25C are schematic diagrams illustrating an exemplary process for switching to the closing position from the opening position according to some embodiments of the present disclosure.
Figure 25B:
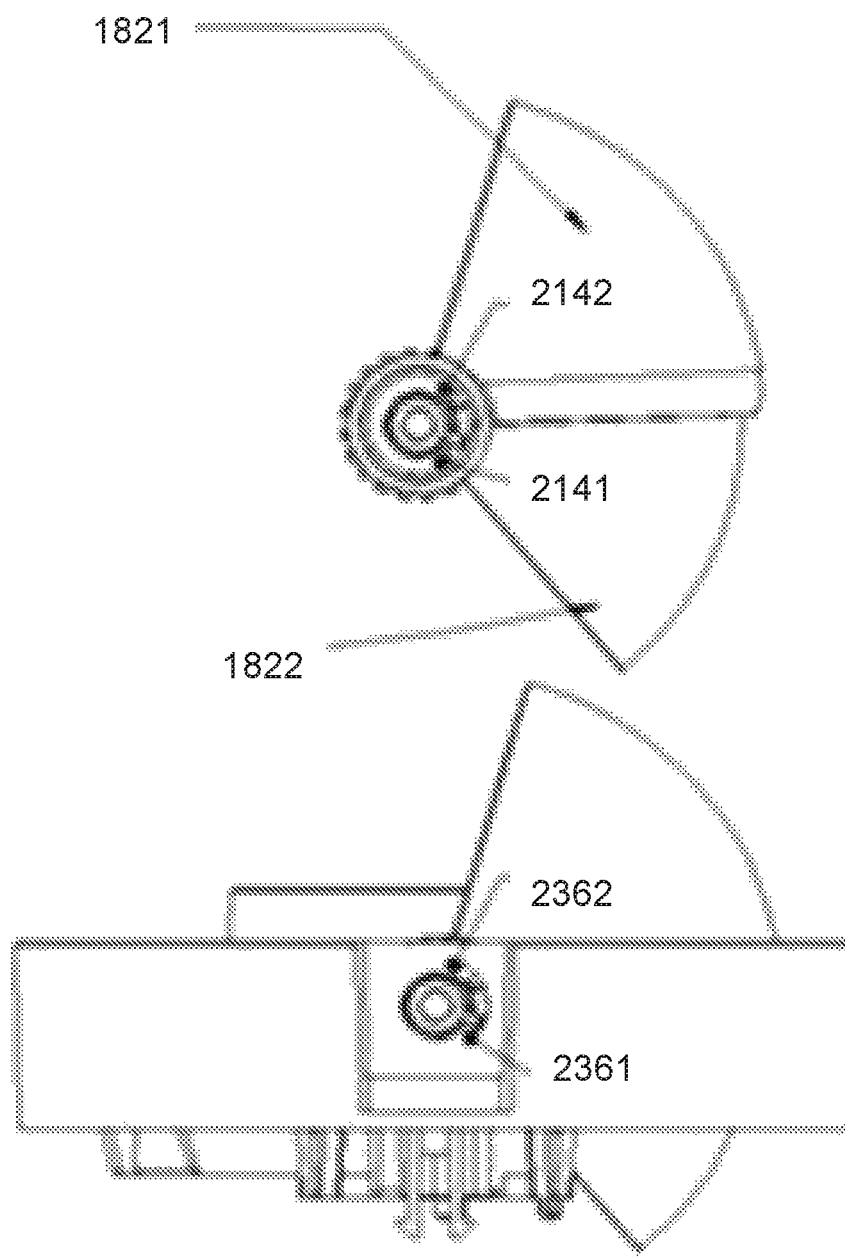

In FIG. 25A, the sheltering sheet group 1802 is in the opening position. The actuating device 1803 may drive the sheltering sheet group 1802 from the opening position (e.g., the position in FIG. 25A) to the closing position (e.g., the position in FIG. 25C). Firstly, the actuating device 1803 may drive the outer sheltering sheet 1821 to rotate around the first axis 1809 towards the location of the opening position. Initially, the inner sheltering sheet 1822 may temporarily keep still, which is to say, with reference to the stopper 1805 of the inner sheltering sheet 1822, the second driving surface 2142 on the outer sheltering sheet 1821 may gradually move away from the stopper 1805, and the first driving surface may gradually move to the stopper 1805. The inner sheltering sheet 1822 may start to move when the first driving surface 2141 attaches the stopper 1805 to enable the stopper to move along with the first driving surface 2141. Then, the inner sheltering sheet 1822 may be driven to pivot towards the closing position. With reference to the second notch structure 1806 of the sheltering sheet stand 1801, the stopper 1805 may be between a third limiting bulge and a fourth limiting bulge, and slowly rotate from the third limiting bulge to the fourth limiting bulge; and when the stopper rotates to the fourth limiting budge to enable the fourth limiting budge to face towards one side of the stopper 1805. The stopper 1805 of the inner sheltering sheet 1822 may be in the second limiting gap and clamped by the first driving surface 2141 on the outer sheltering sheet 1821 and the fourth driving surface 2362 on the sheltering sheet stand 1801. At this time, the inner sheltering sheet 1822 may reach the maximum closing position and stop rotating. Then, the actuating device 1803 may be controlled to be powered off, and the sheltering plate formed by the outer sheltering sheet 1821 and the inner sheltering sheet 1822 may be fixed in the sheltering status, as illustrated in FIG. 25C.

Figure 25C:
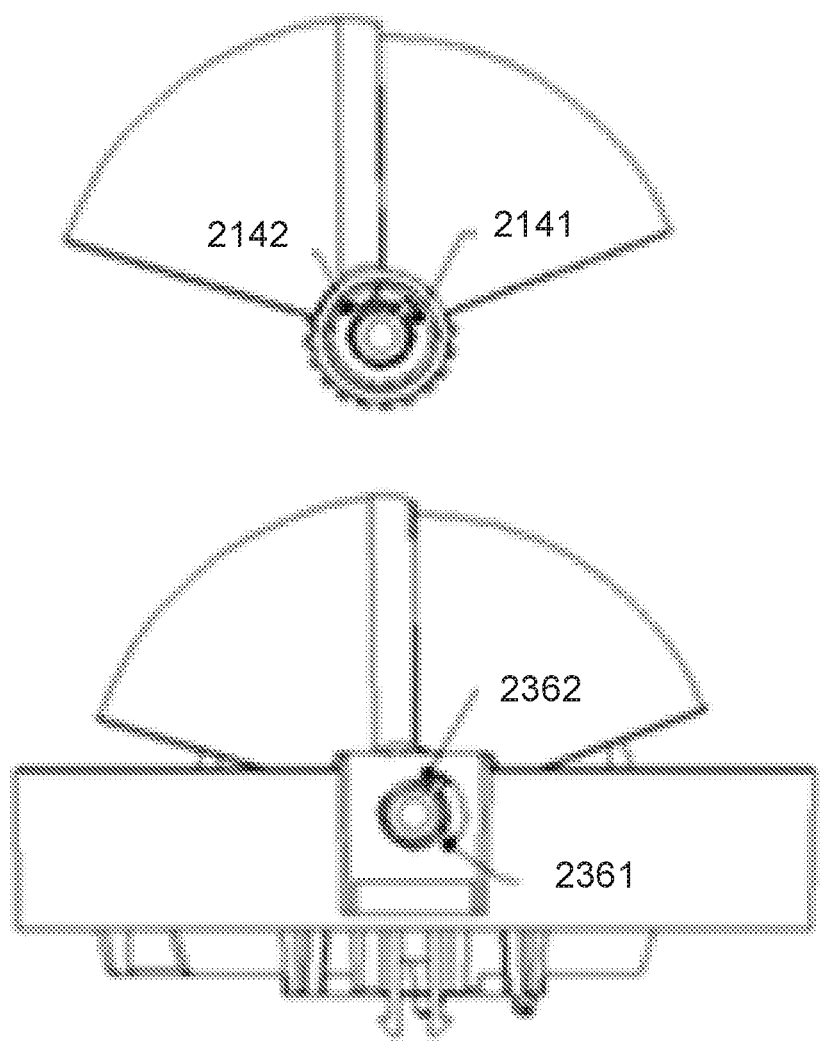

Similarly, in FIG. 25C, the sheltering sheet group 1802 is in the closing position. The actuating device 1803 may drive the sheltering sheet group 1802 from the closing position (e.g., the position in FIG. 25C) to the opening position (e.g., the position in FIG. 25A). The actuating device 1803 may be started and rotate in a reverse direction in the state of the above embodiments. Firstly, the actuating device 1803 may drive the outer sheltering sheet 1821 to rotate around the first axis 1809 towards the location of the opening position, and the inner sheltering sheet 1822 may temporarily keep still, which is to say, with the reference to the stopper 1805 of the inner sheltering sheet 1822, the second driving surface 2142 of the outer sheltering sheet 1821 may gradually move to the stopper 1805, and the first driving surface 2141 may gradually move away from the stopper 1805. The inner sheltering sheet 1822 may start to move when the second driving surface 2142 attaches the stopper 1805 to enable the stopper to move along with the second driving surface 2142. Then, the inner sheltering sheet 1822 may be driven to pivot towards the opening position. With reference to the second notch structure 1806 of the sheltering sheet stand 1801, the stopper 1805 may be between the third limiting bulge and the fourth limiting bulge, and rotate from the fourth limiting bulge to the third limiting bulge while being still originally; and when the stopper rotates to one side of the third limiting budge, as the stopper 1805 of the inner sheltering sheet 1822 may be in the first limiting gap and clamped by the second driving surface 2142 on the outer sheltering sheet 1821 and the third driving surface 2361 on the sheltering sheet stand 1801, the inner sheltering sheet 1822 may reach the maximum closing position and stop rotating. Then, the actuating device 1803 may be controlled to be powered off, and the inner sheltering sheet 1822 and the outer sheltering sheet 1821 may be folded overlapping each other and accommodated in the accommodation space of the sheltering sheet stand 1801, and the sheltering sheet group 1802 may be fixed in the opening position.

In some embodiments, the actuating device 1803 may be in transmission connection with the outer sheltering sheet 1821 in the sheltering sheet group 1802 via a transmission device. The transmission device may include a shaft that is connected to an output end of the actuating device 1803 and a gear mounted on the outer sheltering sheet 1821 in the sheltering sheet group 1802.

It should be noted that, the lens sheltering device disclosed in the present disclosure may use a turbine and a shaft to perform the transmission operation between the actuating device 1803 and the sheltering sheet group 1802, thereby making full use of the self-locking characteristics of the shaft and the turbine. When the sheltering sheet group 1802 is in the opening position or the closing position, the relative position of the shaft and the turbine may also be fixed even if the actuating device 1803 is powered off, so that the sheltering sheet in the sheltering sheet group 1802 may not pivot relative to the first axis 1809.

Specifically, when the inner sheltering sheet 1822 no longer rotates after reaching the maximum closing position, the actuating device 1803 may be powered off. The sheltering plate formed by the outer sheltering sheet 1821 and the inner sheltering sheet 1822 may be fixed in the sheltering status, and the shaft and the turbine may be locked. Similarly, when the inner sheltering sheet 1822 no longer rotates after reaching the maximum opening position, the inner sheltering sheet 1822 and the outer sheltering sheet 1821 may be overlapping each other and accommodated in the accommodation space of the sheltering sheet stand 1801, and the shaft and the turbine may be locked.

In some embodiments, structures of the actuating device 1803 for achieving the driving effect for the sheltering sheet group 1802 may be plural. In some embodiments, the actuating device 1803 may include a motor and an in-place feedback device (also referred to as a status detection unit) for detecting the position information of the sheltering sheet group 1802.

Specifically, the direction of the rotation of the sheltering sheet group may be controlled by the motor which may rotate clockwise and anticlockwise. When the motor drives the outer sheltering sheet and the inner sheltering sheet to rotate to a designated position (e.g., the closing position), the complete blocking of the view of the lens is achieved, thereby achieving the sheltering of the monitoring function. If the sheltering is not needed, the motor may drive the outer sheltering sheet and the inner sheltering sheet to rotate to another designated position (e.g., the open position), thus non-sheltering for the lens is achieved.

The in-place feedback device may control the power-on/off of the actuating device 1803 in response to the position information of the sheltering sheet group 1802. In some embodiments, the in-place feedback device may be a Hall magnet. A Hall plate 1807 in the Hall magnet may be mounted on the sheltering sheet stand 1801, and a magnet 1808 may be mounted on the inner sheltering sheet 1822. When the inner sheltering sheet pivots around the first axis 1809, the magnet 1808 on the inner sheltering sheet 1822 may also pivot around the first axis 1809, and the Hall plate 1807 may achieve in-place detection for the sheltering sheet group 1802 via position sensing between the Hall plate and the magnet 1808.

It should be noted that, the structure may be configured to accurately control the sheltering sheet group 1802 to be located in the opening position or the closing position, so that the sheltering sheet group 1802 may block the view of the lens in the closing position more accurately, and meanwhile, the sheltering sheet group 1802 may be accurately accommodated in the accommodation space of the sheltering sheet stand 1801 in the opening position, thereby avoiding the phenomenon that the view of the lens is not fully sheltered or packed.

It shall be noted that the in-place feedback device in the lens sheltering device disclosed in the present disclosure is not limited to the Hall magnet, and may also be an opto-coupling aligning device and other devices capable of achieving the alignment.

In some embodiments, the actuating device 1803 may include a stepping motor configured to perform a power-on/off operation by calculating the position of the sheltering sheet group 1802.

Specifically, the direction of the rotation of the sheltering sheet group 1802 may be controlled by the stepping motor which may rotate clockwise and anticlockwise. When the motor drives the outer sheltering sheet and the inner sheltering sheet to rotate and to a designated position (e.g., the closing position), the complete blocking of the view of the lens is achieved, thereby achieving the sheltering of the monitoring function. If the sheltering is not needed, the stepping motor may drive the outer sheltering sheet and the inner sheltering sheet to rotate to another designated position (e.g., the open position), thus non-sheltering for the lens is achieved.

It should be noted that, in the whole process, the stepping motor may calculate and judge the position of the sheltering sheet group 1802 by stepping to perform power-on/off control of the whole device. Such structure is simple, and the location judging of the opening position and the closing position of the sheltering sheet group 1802 is achieved with the function of the motor itself, with no need for increasing other judging devices, thereby facilitating the miniaturization of the lens sheltering device disclosed in the present disclosure, and enabling a compact structure of the whole device.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system, comprising:
    a sheltering device configured to operate between a sheltering status to block a view of a camera lens and an open status to unblock the view of the camera lens;
    a holder supporting the sheltering device and having an aperture which let through the camera lens; and
    an actuating device mounted on the holder and connected to the sheltering device, configured to cause the sheltering device to operate between the sheltering status and the open status, wherein:
        the sheltering device includes at least one sheltering sheet pivotable between a first position associated with the open status of the sheltering device, and a second position associated with the sheltering status of the sheltering device, wherein:
            the at least one sheltering sheet includes an outer sheet and an inner sheet,
            in the first position the outer sheet and the inner sheet are folded, and
            in the second position the outer sheet and the inner sheet are unfolded.

2. The system of claim 1, wherein the outer sheet is a master sheet and the inner sheet is a slave sheet during pivoting between the first position and the second position.

3. The system of claim 2, wherein the outer sheet includes a first driving surface and a second driving surface,
    the inner sheet includes a stopper movable between the first driving surface and the second driving surface,
    the first driving surface drives the stopper to move when the at least one sheltering sheet moves from the first position to the second position,
    the second driving surface drives the stopper to move when the at least one sheltering sheet moves from the second position to the first position.

4. The system of claim 3, wherein the outer sheet includes a notch structure, and the first driving surface and the second driving surface form two sides of the notch structure.

5. The system of claim 3, wherein the holder includes a third driving surface, and
    in the second position, the first driving surface and the third driving surface restrict a position of the stopper of the inner sheet.

6. The system of claim 3, wherein the holder includes a fourth driving surface, and
    in the first position the second driving surface and the fourth driving surface restrict a position of the stopper of the inner sheet.

7. The system of claim 1, wherein the actuating device includes
    a gear mounted on the outer sheet to move the outer sheet through a rotation, and
    a shaft connected to the gear to rotate the gear.

8. The system of claim 1, wherein the actuating device includes a status detection unit configured to:
    determine that the at least one sheltering sheet is not in any position of the first position and the second position; and
    actuate the actuating device to move the at least one sheltering sheet until the at least one sheltering sheet reaches one of the first position and the second position.

9. The system of claim 8, wherein the actuating device includes a motor configured to actuate the actuating device when the motor is on.

10. The system of claim 1, further comprising:
    a plurality of imaging devices, each of the plurality of imaging devices configured to capture a component image presenting a scene;
    a storage device storing a set of instructions; and
    at least one processor in communication with the storage device, wherein when executing the instructions, the at least one processor is configured to cause the system to:
    obtain a panoramic image, the panoramic image being formed by combining the plurality of component images according to at least one combination coefficient;
    identify a first occlusion region in the panoramic image;
    determine one or more first parameters associated with the first occlusion region;
    determine, based on the at least one combination coefficient and the one or more first parameters, one or more second parameters associated with a second occlusion region in at least one of the plurality of component images; and
    generate, based on the one or more second parameters, the second occlusion region in the at least one of the plurality of component images.

11. The system of claim 10, wherein the one or more first parameters include a parameter indicating a first occlusion position information of the first occlusion region in the panoramic image,
    the one or more second parameters include a parameter indicating a second occlusion position information of the second occlusion region in the at least one of the plurality of component images, wherein to determine the one or more second parameters associated with the second occlusion region in the at least one of the plurality of component images, the at least one processor is configured to cause the system to:

determine, based on the parameter indicating the first occlusion position information and the at least one combination coefficient, the parameter indicating the second occlusion position information.

12. The system of claim 11, wherein the at least one combination coefficient includes a coefficient relating to a change of width of a component image and a coefficient relating to a distortion of the component image, wherein to determine the parameter indicating the second occlusion position information of the second occlusion region in the at least one of the plurality of component images, the at least one processor is configured to cause the system to:

determine whether the first occlusion region in the panoramic image covers a common line shared by a left component image and a right component image;

in response to a determination that the first occlusion region covers the common line shared by the left component image and the right component image, determine, based on the at least one combination coefficient, the parameter indicating the second occlusion position information of the second occlusion region in the left component image or the right component image.

13. The system of claim 11, wherein the at least one combination coefficient includes a coefficient relating to a change of height of a component image and a coefficient relating to a distortion of the component image, wherein to determine the parameter indicating the second occlusion position information of the second occlusion region in the at least one of the plurality of component images, the at least one processor is configured to cause the system to:

determine whether the first occlusion region in the panoramic image covers a common line shared by an upper component image and a lower component image;

in response to a determination that the first occlusion region covers the common line shared by the upper component image and the lower component image, determine, based on the at least one combination coefficient, the parameter indicating the second occlusion position information of the second occlusion region in the upper component image or the lower component image.

14. The system of claim 10, wherein the one or more first parameters include a parameter indicating a first size information of the first occlusion region in the panoramic image, the one or more second parameters include a parameter indicating a second size information of the second occlusion region in the at least one of the plurality of component images, wherein to determine the one or more second parameters associated with the second occlusion region in the at least one of the plurality of component images, the at least one processor is configured to cause the system to:

determine, based on the parameter indicating the first size information of the first occlusion region and the at least one combination coefficient, the parameter indicating the second size information of the second occlusion region in the at least one of the plurality of component images.

15. The system of claim 14, wherein the at least one combination coefficient includes a coefficient relating to a change of width of a component image and a coefficient relating to a distortion of the component image, wherein to determine the parameter indicating the second size information of the second occlusion region in the at least one of the plurality of component images, the at least one processor is configured to cause the system to:

determine whether the first occlusion region in the panoramic image covers a common line shared by a left component image and a right component image;

in response to a determination that the first occlusion region covers the common line shared by the left component image and the right component image, determine, based on the at least one combination coefficient, the parameter indicating the second size information of the second occlusion region in the left component image or the right component image.

16. The system of claim 14, wherein the at least one combination coefficient includes a coefficient relating to a change of height of a component image and a coefficient relating to a distortion of the component image, wherein to determine the parameter indicating the second size information of the second occlusion region in the at least one of the plurality of component images, the at least one processor is configured to cause the system to:

determine whether the first occlusion region in the panoramic image covers a common line shared by an upper component image and a lower component image;

in response to a determination that the first occlusion region covers the common line shared by the upper component image and the lower component image, determine, based on the at least one combination coefficient, the parameter indicating the second size information of the second occlusion region in the upper component image or the lower component image.

17. A system, comprising:

a plurality of imaging devices, each of the plurality of imaging devices configured to capture a component image presenting a scene;

a storage device storing a set of instructions; and at least one processor in communication with the storage device, wherein when executing the instructions, the at least one processor is configured to cause the system to:

obtain a panoramic image, the panoramic image being formed by combining the plurality of component images according to at least one combination coefficient;

identify a first occlusion region in the panoramic image;

determine one or more first parameters associated with the first occlusion region;

determine, based on the at least one combination coefficient and the one or more first parameters, one or more second parameters associated with a second occlusion region in at least one of the plurality of component images; and generate, based on the one or more second parameters, the second occlusion region in the at least one of the plurality of component images.

18. The system of claim 17, wherein the one or more first parameters include a parameter indicating a first occlusion position information of the first occlusion region in the panoramic image, the one or more second parameters include a parameter indicating a second occlusion position information of the second occlusion region in the at least one of the plurality of component images, wherein to determine the one or more second parameters associated with the second occlusion region in the at least one of the plurality of component images, the at least one processor is configured to cause the system to:

determine, based on the parameter indicating the first occlusion position information and the at least one combination coefficient, the parameter indicating the second occlusion position information.

* * * * *